US011520033B2

(12) United States Patent
Zelenskiy et al.

(10) Patent No.: US 11,520,033 B2
(45) Date of Patent: Dec. 6, 2022

(54) TECHNIQUES FOR DETERMINING A LOCATION OF A MOBILE OBJECT

(71) Applicant: Amazon Technologies, Inc., Seattle, WA (US)

(72) Inventors: Lev Zelenskiy, Kelvin Grove (AU); Shaunak Joshi, North Lakes (AU); Michael John Neville, Bunya (AU); Nicholas Spring, Gold Coast (AU); Ryan Koscianski, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 214 days.

(21) Appl. No.: 16/712,844

(22) Filed: Dec. 12, 2019

(65) Prior Publication Data

US 2021/0181331 A1    Jun. 17, 2021

(51) Int. Cl.
  *G01S 13/72*  (2006.01)
  *G06V 20/56*  (2022.01)
  *G08G 1/0962*  (2006.01)

(52) U.S. Cl.
  CPC .............. *G01S 13/72* (2013.01); *G06V 20/56* (2022.01); *G08G 1/0962* (2013.01)

(58) Field of Classification Search
  CPC ................. G01S 13/72; G08G 1/0962; G06T 2207/30236; G06T 2207/30241; G06T 7/246; G06K 9/00812; G06K 9/6288; H04W 4/026; H04W 4/027; H04W 4/029; G01C 21/14; G06V 20/56
  See application file for complete search history.

(56) References Cited

U.S. PATENT DOCUMENTS

| 8,886,387 | B1* | 11/2014 | Agarwal | G06K 9/00791 |
| | | | | 701/28 |
| 2007/0073473 | A1* | 3/2007 | Altan | G01S 13/931 |
| | | | | 701/518 |
| 2010/0100268 | A1* | 4/2010 | Zhang | G06K 9/00825 |
| | | | | 701/25 |

(Continued)

FOREIGN PATENT DOCUMENTS

| WO | 2014072971 | 5/2014 |
| WO | 2018229751 | 12/2018 |

OTHER PUBLICATIONS

Application No. PCT/US2020/064563, International Search Report and Written Opinion, dated Apr. 23, 2021, 13 pages.

*Primary Examiner* — Qun Shen
(74) *Attorney, Agent, or Firm* — Kilpatrick Townsend & Stockton LLP

(57) ABSTRACT

Techniques are disclosed for determining a location of an object based at least in part on a motion of the object. The techniques include generating a motion profile based at least in part on motion data received from a mobile device that is associated with the object. The techniques further include receiving, from a camera at a location, a plurality of images that identifies a candidate motion of a candidate object through at least a portion of the location. The techniques further include generating a candidate motion profile corresponding to the candidate motion of the candidate object based at least in part on the plurality of images. Based at least in part on a score generated by comparing the motion profile with the candidate motion profile, the techniques may determine that the candidate object is the object.

20 Claims, 8 Drawing Sheets

(56) References Cited

U.S. PATENT DOCUMENTS

| | | | |
|---|---|---|---|
| 2011/0134240 A1* | 6/2011 | Anderson | H04W 4/38 348/143 |
| 2013/0238241 A1* | 9/2013 | Chelotti | G06Q 10/109 701/538 |
| 2014/0100835 A1* | 4/2014 | Majumdar | G06Q 10/04 703/11 |
| 2017/0323453 A1* | 11/2017 | Lee | H02S 20/32 |
| 2018/0070213 A1* | 3/2018 | Ali | G01C 21/206 |
| 2019/0197430 A1* | 6/2019 | Arditi | G01C 21/3438 |
| 2020/0125868 A1* | 4/2020 | Naamani | G08G 1/142 |
| 2020/0309536 A1* | 10/2020 | Omari | G07C 5/008 |
| 2021/0018916 A1* | 1/2021 | Thakur | G07C 5/0808 |

* cited by examiner

TECHNIQUES FOR DETERMINING A LOCATION OF A MOBILE OBJECT

BACKGROUND

As object tracking technology improves, more and more techniques are developed that improve every-day tasks and increase efficiencies using mobile electronic devices. Some of these techniques include enabling service providers to accurately predict a location of an actively moving device in order to improve the accessibility of the services being offered.

However, attempting to predict the location of actively moving mobile devices within relatively small and/or enclosed/covered spaces (e.g., a building or a parking garage) can be challenging and prone to inaccuracies.

BRIEF DESCRIPTION OF THE DRAWINGS

Various embodiments in accordance with the present disclosure will be described with reference to the drawings, in which.

DETAILED DESCRIPTION

Figure 1:
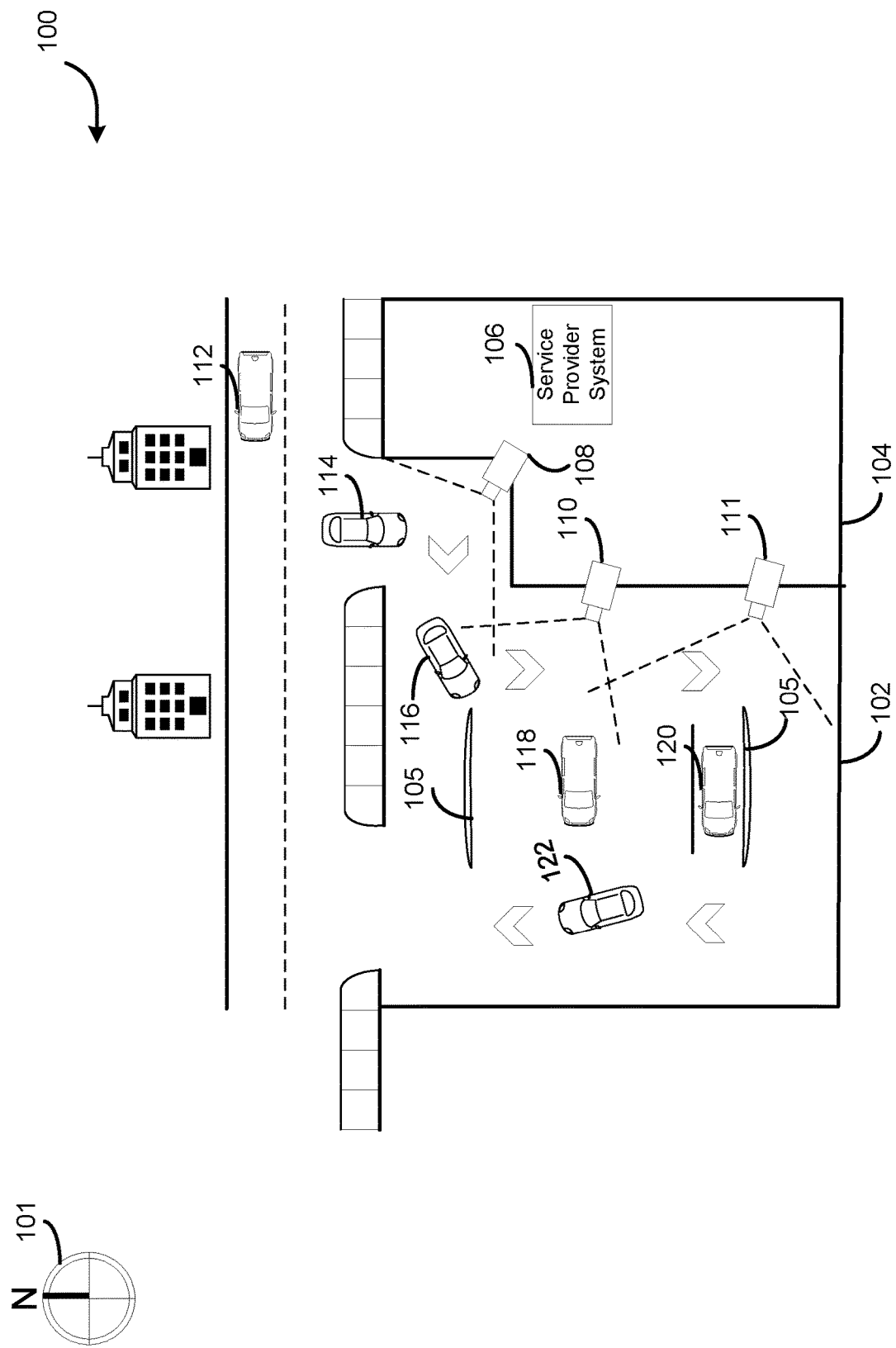
FIG. 1 is simplified block diagram illustrating techniques for determining a location of a mobile object, according to some embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, determining a location of an object among a set of candidate objects by comparing respective motion profiles of the various objects based on different sets of data. For example, a first profile of one object may be generated based at least in part on a first set of data collected for that object, and one or more other candidate profiles can be generated for various other objects based on a second (different) set of data collected for those objects. As time progresses and/or as the objects move, the respective profiles can be updated (e.g., in parallel) and compared, until a match with a high enough confidence level is detected. Once this relative match is detected, it can be deduced that the initial object and one of the candidate objects (the matching object) are the same object. In this way, the respective profiles that are constructed from different types of data can be used to determine the location of an object.

In some embodiments, an object may be a type of vehicle (e.g., an automobile). The vehicle may be associated with a mobile device (e.g., a mobile phone carried by a driver), whereby the mobile device transmits motion data corresponding to a motion of the vehicle. For example, the mobile phone may include one or more sensor devices (e.g., a Global Positioning System (GPS) receiver) that transmits a first set of data that is used to generate a motion profile of the vehicle. A second set of data (e.g., images from a video frame sequence) may be collected from a camera surveilling at least a portion of a location (e.g., a parking lot). For example, the parking lot may have one or more vehicles that are captured by the camera. The one or more vehicles may respectively correspond to candidate vehicles, one of which may match the vehicle (i.e., the target/matching vehicle) that corresponds to the first set of data. Different motion profiles (also known as "candidate motion profiles") may be created for each of the candidate vehicles based at least in part on the second set of data. Upon determining that the motion profile matches a candidate motion profile for one of the candidate vehicles (e.g., the profiles are highly correlated with each other), the computing system may determine that the candidate vehicle associated with the candidate motion profile is the same vehicle as the vehicle associated with the motion profile.

In an illustrative example, consider a scenario in which the user is a customer of a distribution company which maintains a pickup center location. The customer may place an order of items (e.g., groceries) from the distribution company, for example, from their mobile phone. Upon placing the order, the customer may indicate that they will soon be arriving in their vehicle to pick up the order (e.g., at a parking lot of the pickup center location). In this example, the mobile device may be carried with the user as the user drives the vehicle, and thus, shares a motion with the vehicle. As the vehicle moves (e.g., accelerates, decelerates, turns, stops, starts, maintains course, etc.), the mobile device may collect sensor data corresponding to the motion of the mobile device (and, by association, the shared motion of the vehicle). The mobile device may then transmit the sensor data to a computing system. The motion data may be used to generate a motion profile of the vehicle's motion. The motion data may include acceleration data, orientation data, positioning data, or any other suitable measurement data generated by one or more sensor devices of the mobile device (e.g., from an inertial measurement unit (IMU) and/or GPS receiver of the mobile device). In some embodiments, updated motion data may be transmitted in real-time (e.g., every millisecond, every second, every five seconds, etc.) to the computing system as the vehicle is in route to the pickup center. Upon receiving the motion data from the mobile device, the computing system may utilize a sensor fusion algorithm (e.g., a Kalman filter or particle filter) to weigh the measurement data received from the different sensors to determine a motion profile of the vehicle. This motion profile may be updated as updated motion data is received and processed while the vehicle is in route to a final parking location within the parking lot.

Meanwhile, a camera (e.g., a stationary camera and/or a mobile camera) may be configured to surveil at least a portion of the parking lot that is within a field of view of the camera. The camera may transmit to the computing system a plurality of images that may correspond to a stream of video frames captured by the camera. When the vehicle arrives at the parking lot, the stream of video frames may begin capturing the motion of the vehicle. However, at this point, the computing system may still not have determined an acceptable level of confidence that the vehicle captured within the video frames is the same as the vehicle associated with the motion profile (i.e., it is still a candidate vehicle). Accordingly, the computing system may generate a candidate motion profile of the candidate vehicle based at least in part on the plurality of images, whereby the candidate motion profile corresponds to a motion of the candidate vehicle (which may potentially be the same vehicle as the vehicle). In some embodiments, the candidate motion profile may be generated utilizing an algorithm that determines an object's motion based at least in part on changes in pixels (e.g., changes in color) between images. In some embodiments, the candidate motion profile may be generated using a neural network that is trained to detect one or more aspects of the candidate vehicle's motion (e.g., left turn, right turn, acceleration, deceleration, etc.).

In some embodiments, upon generating the candidate motion profile, the computing system may then compare (e.g., determine a correlation between) the motion profile with the candidate motion profile to determine if the candidate vehicle is the vehicle (i.e., the target vehicle associated with the motion profile). For example, the computing system may determine if aspects of the motion of the vehicle captured by the motion profile (e.g., turn right, then go straight, then turn left) substantially match (e.g., correlate with) aspects of the motion of the candidate vehicle captured by the candidate motion profile. It should be understood that, just as the motion profile may be updated over time, one or more candidate motion profiles may also be updated as new images are received and processed by the computing system. Accordingly, as the respective motion profiles are updated, a confidence level (e.g., a score) associated with whether the motion profiles match may be increased or decreased. Upon determining, at an acceptable confidence level, that the candidate motion profile matches the motion profile, the system may determine that the candidate vehicle is the same vehicle as the target vehicle.

In some embodiments, upon determining that the candidate vehicle is the target vehicle, the computing system may transmit a message to a computing device (e.g., a tablet device) of an associate of the pickup center that is tasked with delivering the order to the customer's vehicle upon arrival in the parking lot. In some embodiments, the message may be associated with a video stream (e.g., corresponding to the field of view of the surveillance camera) that highlights on the tablet device the determined target vehicle among a plurality of candidate vehicles that are also captured by the video stream (e.g., other candidate vehicles that may be moving or parked within the parking lot). In this way, the associate may efficiently determine which candidate vehicle is the correct vehicle to deliver the order. In some embodiments, the message may be transmitted when the computing system determines, at an acceptable confidence level (e.g., according to a predetermined threshold value), that the candidate vehicle is the correct matching vehicle. For example, the computing system may wait until the candidate vehicle has parked (e.g., stopped moving for a period of time) before transmitting the message. In some embodiments, the message may be transmitted even before the candidate vehicle has parked, and/or before the computing system has determined with acceptable confidence that a candidate vehicle is the correct vehicle that matches the target vehicle. For example, the computing system may apply a color-coded highlight around a candidate vehicle displayed in the video stream on the associate's tablet device, even as the candidate vehicle continues moving in the parking lot.

As the candidate vehicle moves, the computing system may continue comparing an updated motion profile with an updated candidate motion profile, and accordingly adjust the color-coded highlight to indicate to the associate any adjustments to the confidence level. In this way, the associate may efficiently take action to begin delivery of the order to an increasingly probable candidate vehicle (e.g., begin walking to the vehicle) even before the candidate vehicle is parked.

In some embodiments, when the customer's vehicle approaches the pickup center, the computing system may determine that the vehicle is near the pickup center. For example, the computing system may use motion data from the mobile device (e.g., GPS data) to determine that the vehicle is within a certain range of the pickup center (e.g., 100 meters). Upon determining the vehicle is near the pickup center, the computing system may then (e.g., in order to optimize processing demands) begin analysis of the plurality of images from the video stream to generate candidate motion profiles of candidate vehicles detected within the plurality of images.

As noted above, in some embodiments, a plurality of candidate vehicles (e.g., moving or stationary) may be captured within the plurality of images corresponding to the video stream.

Accordingly, in some embodiments, the computing system may generate candidate motion profiles for each of the plurality of candidate vehicles captured. The computing system may then compare, respectively, the candidate motion profile for each candidate vehicle with the motion profile generated from the motion data received from the customer's mobile device. Each comparison may generate a score (e.g., a probability) that corresponds to a confidence level of a valid match between the two motion profiles (i.e., between the candidate motion profile and the motion profile). In some embodiments, the scores may be ranked and then the candidate motion profile of the candidate vehicle associated with the highest ranked score may be determined to be the matching vehicle.

In some embodiments, one or more known physical characteristics of a vehicle (i.e., target vehicle) may be additionally utilized when comparing the motion profile (e.g., determined from the mobile device motion data) with a candidate motion profile (determined from the plurality of images). For example, the customer may register a license plate that is attached to their vehicle with an account associated with their order. When the vehicle arrives at the parking lot, the computing system may detect (e.g., via Automated License Plate Recognition (ALPR) of the plurality of images) that a candidate vehicle matching the registered license plate has arrived. It should be understood that, while utilizing known physical characteristics of the vehicle may be utilized to increase the confidence level of a valid match between vehicles, embodiments of the present disclosure may be performed even when such known physical characteristics are not known or otherwise unavailable. For example, the surveillance camera may only detect a motion of only a portion of a candidate vehicle (e.g., not capturing the license plate). In this example, the computing system may still be able to generate the candidate motion profile of the candidate vehicle that is suitable for comparison with the motion profile of the target vehicle. In some embodiments, the one or more known physical characteristics may also be used for providing detailed alerts of a likely candidate vehicle to a user. For example, in addition to transmitting a message that highlights the likely candidate vehicle, the computing system may also transmit information about the one or more physical characteristics of the likely candidate vehicle. For example, the message may indicate the color, type, etc. of the vehicle (e.g., that the vehicle is a sedan, is colored white, has a particular make/model, and/or has a particular license plate identifier).

The embodiments of the present disclosure may provide many technical advantages over existing systems. In one example, using conventional techniques, existing systems may rely on processes that map a parked vehicle to a designated (e.g., pre-defined) parking space of a parking lot. However, these types of systems are subject to several challenges. For example, a calibrated camera may easily be accidentally knocked or drift over time, thus requiring regular maintenance, which may require significant computing and/or human resources. Additionally, these systems significantly constrain the throughput of processing vehicles for service (e.g., order fulfillment) due at least to the fact that the system may process only those vehicles that are mapped to a designated parking space among a limited number of parking spaces.

In contrast, embodiments of the present disclosure provide techniques for locating a vehicle that enable at least the technical advantages of more efficient processing of vehicles (e.g., at a pickup center) and greater system accuracy and resiliency. In particular, embodiments disclosed herein enable the system to detect, locate, and match (e.g., identify) a particular candidate vehicle captured by a camera as being the vehicle associated with a customer order, even if the candidate vehicle is not parked in a designated parking space and/or only a portion of the candidate vehicle is captured by the camera (e.g., for example, if the portion does not include a unique physical characteristic that may otherwise be used to match the candidate vehicle to a customer order). In this way, embodiments of the present disclosure may increase the throughput of processing vehicles by allowing vehicles to park in non-designated spaces, and still enable the system to efficiently fulfill customer orders. Furthermore, the vehicle may be located and identified, and an appropriate alert message may be transmitted to an associate tasked with fulfilling the order even before the vehicle is parked (e.g., while the vehicle is still in motion). This may further increase efficiency by allowing the associate to take appropriate action earlier in the order fulfillment process. Additionally, whereas some existing systems may locate a vehicle via GPS locating, this locating mechanism may suffer from inaccurate measurements, particularly in a crowded parking lot or an urban environment with taller buildings.

Embodiments of the present disclosure improve accuracy by combining visual object locating with dead reckoning (e.g., utilizing sensor fusion from the motion data of a mobile device associated with the vehicle) to more accurately locate a particular vehicle among a plurality of moving or stationary vehicles. Finally, even if a camera may incur drift over time or may be slightly bumped, embodiments of the present disclosure may still be performed without requiring significant maintenance to re-calibrate the cameras (e.g., to map designated parking spaces of the parking lot to a three-dimensional (3D) coordinate space of a camera).

In the interest of clarity of explanation, the embodiments of the present disclosure are described in connection with a parking lot of a pickup center. One or more cameras may be set up to capture images representing at least a portion of the parking lot that is within the field of view of the one or more cameras. Although embodiments described herein primarily depict one or more cameras being mounted (e.g., as a surveillance camera in a parking lot), it should be understood that the one or more cameras may be positioned in any suitable way. For example, a camera may be carried (e.g., as a component of a mobile phone that is carried by an associate), worn (e.g., as a headset device), flown (e.g., in the case of a drone), etc. The camera(s) may also capture vehicles entering/exiting the parking lot and parking in a parking location, whether a designated parking space (e.g., with visible boundary lines) or a non-designated parking space (e.g., a non-demarcated parking area). However, embodiments are not limited as such. Instead, the embodiments may similarly apply to locating any suitable target object moving within a physical topography (e.g., location) that is within the field of view of a camera. For example, embodiments of the present disclosure may be used to locate a person (e.g., among a plurality of people) that is walking in a floor on a building (e.g., carrying a mobile device with them), a drone (e.g., among a plurality of drones) moving through mid-air, etc.

FIG. 1 illustrates a top-down view 100 of an example parking lot under camera surveillance by a computing system, according to some embodiments of the present disclosure. In FIG. 1, a parking lot 102 for a pickup location 104 is depicted. In one illustrative example, the pickup location 104 may correspond to a customer order fulfillment center in which customers may drive their vehicles to the parking lot 102 to pick up their orders. Upon a customer arriving at the pickup location 104 and parking the vehicle, an associate of the fulfillment center may deliver the fulfilled customer order (e.g., groceries or other items) to the vehicle. The customer may then drive the vehicle to exit the parking lot 102.

In some embodiments, the parking lot 102 may include a parking area 105 (e.g., a parking zone) for vehicles to park. In some embodiments, the parking area 105 may be defined by markers, as depicted in FIG. 1. In some embodiments, the parking area 105 may include a non-demarcated area where one or more cars may freely park within the parking area 105. For example, FIG. 1 depicts vehicle 118 parked in a non-demarcated space within the parking area 105. In some embodiments, the parking area 105 may include one or more designated parking spaces, whereby some designated parking spaces (e.g., defined by a demarcation line) may contain parked vehicles. For example, as depicted in FIG. 1, vehicle 120 may be parked in a parking space that is designated by a demarcation line. In some embodiments, for example, as depicted in FIG. 1, the parking area 105 may include a combination of a non-demarcated area for parking and one or more demarcated parking spaces. In other embodiments, the parking area may be exclusively a non-demarcated area (e.g., an open space) for parking. Alternatively, the parking area may be exclusively a demarcated area for parking. It should be understood that any suitable configuration of a parking area within the parking lot may be used to perform embodiments of the present disclosure. For example, a non-demarcated parking area of a parking lot may allow vehicles to park near the corners of the parking lot, or in other areas of the parking lot, so long as the parked vehicles do not block ingress or egress of other vehicles into/from the parking lot.

In some embodiments, the pickup location 104 may be associated with a service provider system 106. For example, continuing with the example above, the service provider system 106 may include a computer system of the customer order fulfillment center. In some embodiments, the service provider system 106 may be housed on premises (e.g., at the pickup location 104). In other embodiments, the service provider system 106 may be housed off premises (e.g., at a remote location, such as the company headquarters, or server farm, etc.). The service provider system 106 may further include (and/or be connected to) one or more cameras (e.g., camera 108, camera 110, camera 111). In some embodiments, a camera of the service provider system 106 may be mounted such that the camera's field of view captures at least a portion of the parking lot 102. For example, as depicted in FIG. 1, camera 108 may have a field of view that captures vehicles entering the parking lot 102 (e.g., vehicle 114, vehicle 116), while cameras 110 and 111 may, respectively, have a field of view that captures another portion of the parking lot 102 (e.g., portions of parking area 105, ingress and egress areas, etc.). In some embodiments, video frames (e.g., images) from each of the one or more cameras may be collectively utilized to perform embodiments of the present disclosure. For example, in some embodiments, the one or more cameras may have overlapping fields of view whereby at least two cameras may capture images of the same object at the same time. For example, in FIG. 1, camera 108 may have an overlapping field of view with camera 110, whereby both cameras may capture vehicle 116 within their respective fields of view. Similarly, cameras 110 and 111 may also have overlapping fields of view, whereby both cameras may capture vehicle 118 within their respective fields of view. In some embodiments, the service provider system 106 may receive video frames from each of these cameras and utilize the overlapping fields of view to generate a virtual field of view (e.g., of a "virtual camera") that spans the field of view the one or more cameras. In this way, as described further below, the service provider system 106 may perform embodiments of the present disclosure utilizing multiple physical cameras. Accordingly, although for clarity of illustration purposes, embodiments described herein may refer to a single camera utilized to perform embodiments of the present disclosure, embodiments should not be construed to be so limiting (e.g., the output one or more physical cameras may be used for generating a software-based virtual camera). It should also be understood that, in some embodiments, a camera utilized for performing embodiments described herein may be a component of the service provider system 106 within or connected to the same physical unit (e.g., a mobile phone or tablet device carried by an associate). In this case, the mobile device may be equipped to perform one or more functions of the service provider system 106.

In some embodiments, a customer may first place an order with the customer order fulfillment center and thereby alert the service provider system 106 that they will soon be arriving at the pickup location 104. For example, as depicted in FIG. 1, the customer who is driving vehicle 112 may be on their way (e.g., driving on public roads) to the pickup location 104. It should be understood that vehicle 112 may not yet be within the field of view of any of the cameras connected to the service provider system 106. However, the service provider system 106 may still receive motion data (e.g., GPS position data, acceleration data, and/or orientation data) from the vehicle 112 (e.g., a mobile phone carried by the customer driving the vehicle 112). Once a vehicle arrives at the pickup location 104 and pulls into the parking lot 102, one or more of the cameras may capture the vehicle (e.g., vehicle 114). At this point, using vehicle 114 as an example, the service provider system 106 may receive both motion data from the mobile phone associated with vehicle 114 and image data from one or more of the cameras (e.g., camera 108) that capture the vehicle 114. As described in more detail below, the service provider system 106 may use each of these sources of data to generate and compare respective motion profiles (e.g., according to a relative geographic direction 101) to locate and identify a particular vehicle as it proceeds to park. For example, the service provider system 106 may locate vehicle 116 as it proceeds to park in the parking area 105. In this way, the service provider system 106 may identify particular vehicles in a crowded parking lot, even in parking areas (e.g., parking area 105) which may include a non-demarcated area for parking. For example, as vehicle 116 proceeds to park, the service provider system 106 may identify vehicle 116 among the other vehicles within the field of view (e.g., a virtual field of view), including vehicles 118, 120, and 122.

Figure 2:
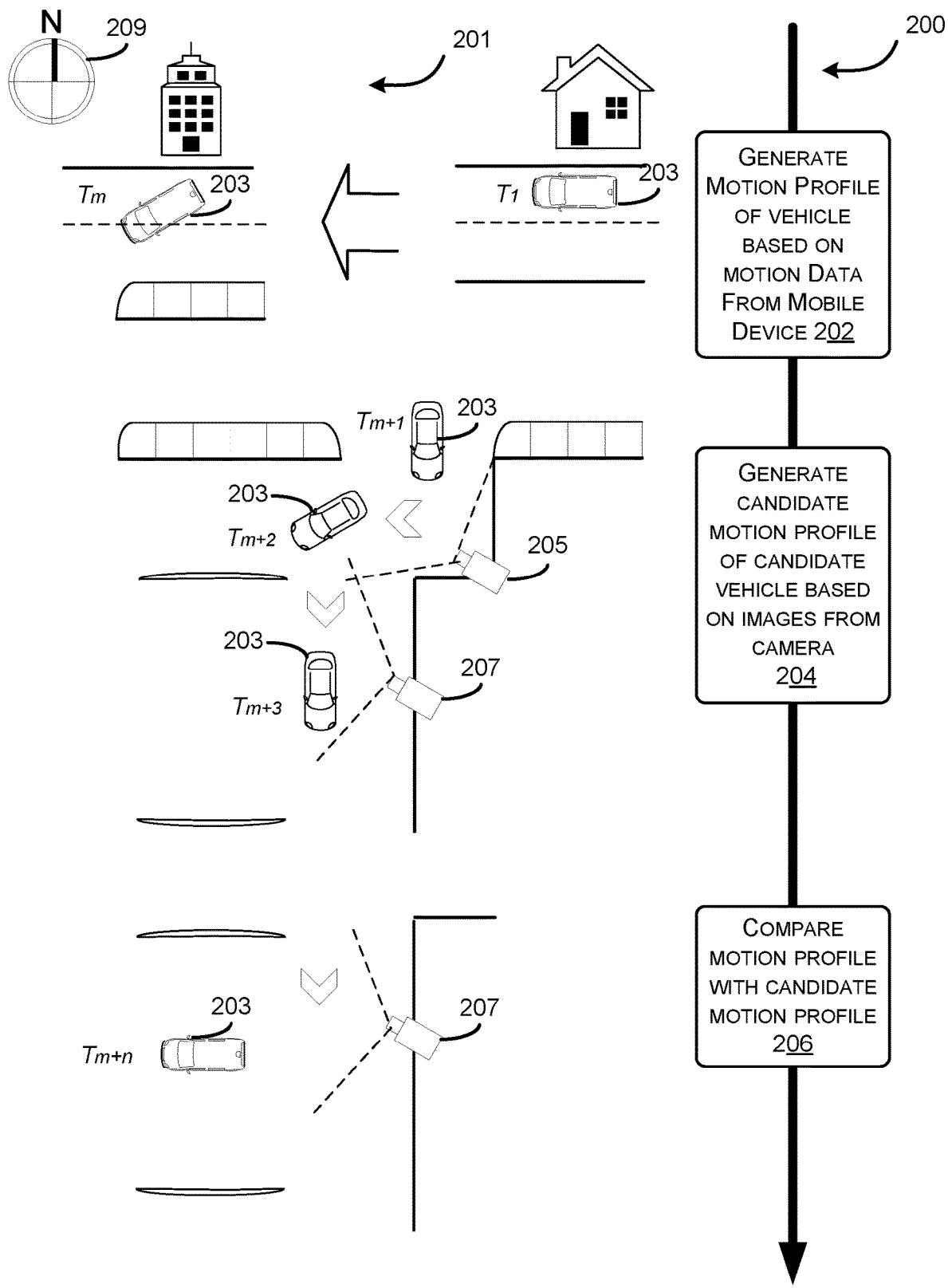
FIG. 2 is a simplified flow chart illustrating techniques for determining a location of a mobile object, according to some embodiments of the present disclosure.

FIG. 2 illustrates a simplified diagram depicting an example process performed by a system, according to some embodiments of the present disclosure. The process 200 is an example high-level process for identifying a vehicle at a parking lot under camera surveillance by a system (e.g., service provider system 106). The diagram 201 depicts example states that correspond to blocks of the process 200. The diagram 201 may include elements that are similar to those depicted in reference to FIG. 1. For example, vehicle 203 may represent one of the vehicles depicted in FIG. 1 (e.g., vehicle 112, 114, 116, and/or 118). Additionally, cameras 205 and 207 may correspond to one of the cameras in FIG. 1 (e.g., camera 108 or 110).

At block 202, the system may generate a motion profile of a vehicle based on motion data from a mobile device. Continuing with an earlier example, a customer may place an order with an order fulfillment center, for example, via a mobile application on their mobile phone. When the customer is ready to pick up the order, the customer may indicate that they will soon be arriving at a pickup location to pick up the order. At time $T_0$, the customer may begin driving their vehicle 203 from home to the pickup location of the order fulfillment center. In some embodiments, the customer may carry their mobile phone with them while driving. In this way, motion data (e.g., acceleration, orientation, and/or positioning data) that is measured by one or more sensor devices of the mobile phone may also be associated with a motion of the vehicle. It should be understood that, although in this example, the mobile phone may be a separate device that is associated with the vehicle, embodiments of the present disclosure should not be construed to be so limiting. For example, the vehicle (e.g., or other suitable object) may have a computing system built into the vehicle that transmits motion data. As depicted in diagram 201, at time $T_1$, the mobile phone may begin transmitting motion data to the system (e.g., via the mobile application which they used to place the order). The system may receive the motion data from the mobile phone and utilize the motion data to generate a motion profile of the vehicle (by association with the mobile phone), which may be represented in some embodiments as a motion profile table, as described below in reference to FIG. 3.

In particular, at time $T_1$, the mobile phone may transmit to the system a motion data measurement corresponding to the motion of vehicle 203. The motion data measurement for time $T_1$ may measure a time interval between time $T_0$ and time $T_1$, and may indicate that the vehicle 203 is at a particular position (e.g., a GPS coordinates), traveling with a particular acceleration (e.g., 2 meters/second), etc. In some embodiments, the motion data measurement for a particular time interval may be stored as an entry in a motion data table. The system may then use the motion data measurement to generate a new entry in a motion profile table indicating that the vehicle 203 is traveling West (according to the geographic direction 209). While the vehicle is in route to the pickup center, from time $T_1$ until $T_m$, the mobile phone may continually transmit motion data measurements to the system, upon which the motion profile table may be updated with new entries for each time interval (e.g., right turn, left turn, increased speed, decreased speed, etc.). Note that in some cases, the vehicle 203 motion may remain substantially the same, in which case similar motion data measurements may be sent, and the motion profile table may register that the motion pattern has not changed. At time $T_m$, the vehicle 203 may be in the process of turning left into the parking lot, which may be in a Southwest direction, upon which the motion data transmitted at time $T_m$ may be used to update the motion profile table. Note that up until time $T_m$ (e.g., between time $T_0$ and $T_m$), none of the cameras from the parking lot may have captured vehicle 203 within their field of view.

At block 204, the system may generate a candidate motion profile of a candidate vehicle based on images received from a camera. For example, at time $T_{m+1}$ of FIG. 2, the vehicle 203 may be entering the parking lot associated with the pickup location, which may be similar to the parking lot 102 and pickup location 104 of FIG. 1. When the vehicle 203 is entering the parking lot at time $T_{m+1}$, camera 205 may capture vehicle 203 within its field of view and transmit one or more video frames identifying the motion of vehicle 203. Similarly, between time $T_{m+1}$ and $T_{m+n}$, the cameras mounted in the parking lot (e.g., cameras 205 and 207) may transmit a series of video frames identifying the motion of the vehicle 203 in the parking lot, and which may be used by the system in generating one or more entries of a candidate motion profile (e.g., represented in a table, with an entry per time interval) of vehicle 203 (as a candidate vehicle), as described further below in reference to FIG. 3.

At block 206, the system may determine if the vehicle corresponding to the motion profile (generated at block 202) is the same as the candidate vehicle corresponding to the candidate motion profile (generated at block 204) at least in part by comparing the motion profile with the candidate motion profile. For example, the system may compare the entries for each of the time intervals between the motion profile and the candidate motion profile, starting from the time when the vehicle 203 first was detected by the system via one of the cameras (e.g., $T_{m+1}$). In one example, and as described further below in reference to FIG. 3, the entries for $T_{m+1}$, $T_{m+2}$, $T_{m+3}$, $T_{m+n}$ may be substantially the same between the motion profile and the candidate motion profile. In some embodiments, for each comparison, the system may generate a score that corresponds to a confidence level (e.g., a probability score between 0-1) that the vehicle corresponding to the motion profile and the candidate vehicle corresponding to the candidate motion profile are the same vehicle. In this way, the score may updated over time (either up or down) as new motion data is received and/or derived. Because the entries in this example are substantially the same between the two motion profiles (starting from the $T_{m+1}$ entry), the score may be close to 1.0 (e.g., indicating high confidence that the motion profiles correspond to the same vehicle). In some embodiments, the system may utilize a predetermined threshold value to determine with an acceptable confidence level that the two profiles correspond to the same vehicle. The predetermined threshold value may be determined in any suitable way, for example, by a system administrator of the service provider based on historical matching accuracy data.

Figure 3:
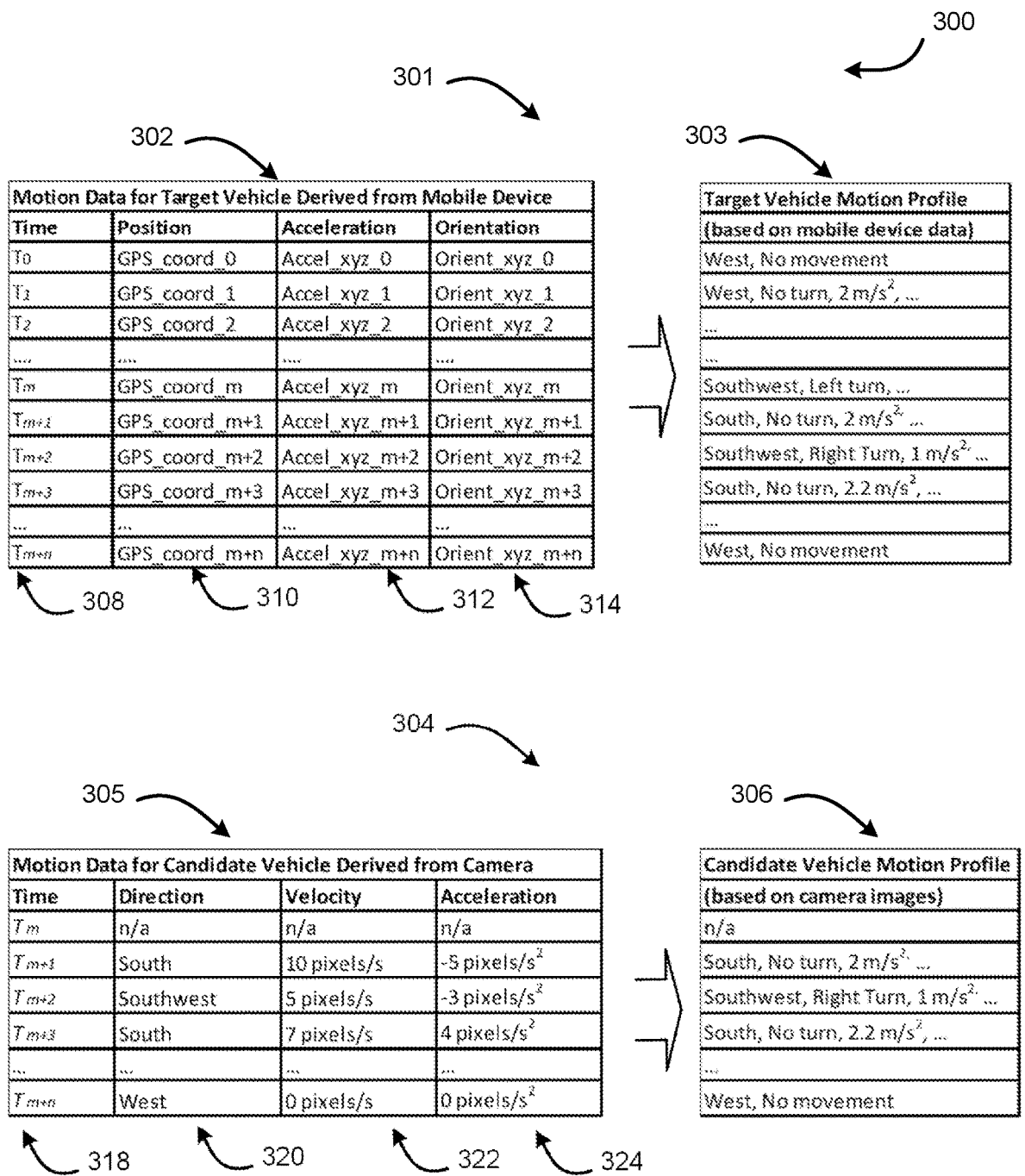
FIG. 3 is a simplified block diagram illustrating techniques for determining a location of a mobile object, according to some embodiments of the present disclosure.

FIG. 3 depicts a diagram 300 including example techniques used by a computing system for generating motion profiles of a vehicle. In the diagram 300, two different flows, 301 and 304, are depicted. Flow 301 depicts a process whereby a system receives motion data 302 from a mobile device and utilizes the motion data 302 to generate a motion profile 303 of a vehicle (e.g., whereby the vehicle is associated with the mobile device). Flow 304, discussed in further detail below, depicts a process whereby the system receives a plurality of images from a camera, derives motion data 305 from the images, and utilizes the motion data 305 to generate a candidate motion profile 306 of a candidate vehicle (which may be the target vehicle). For clarity of illustration, the motion of the vehicle described in reference to motion profile 303 and candidate motion profile 306 be similar to the motion of vehicle 203 of FIG. 2.

Turning to flow 301, the motion data 302 may measure one or more aspects of a motion of the mobile device (and correspondingly, an associated vehicle) and may be received by the system in real-time according to any suitable time cadence (e.g., a predetermined time interval between measurements). For example, the mobile phone may transmit motion data to the system every millisecond, every few milliseconds, etc. As described earlier, the motion data 302 may measure an acceleration, an orientation, and/or a position of the mobile device. Any suitable motion data may be received and utilized as part of flow 301.

In some embodiments, motion data measurements may be received and/or stored by the system for further processing. For example, as depicted in FIG. 3, the motion data 302 may be stored in a table of a database, whereby a new row may be added to update the table upon receiving a new motion data measurement from the mobile device. It should be understood that, while tables (e.g., of a database) are depicted in FIG. 3 as representing respective motion data and motion profiles, any suitable data structure and/or optimizations may be utilized to perform the techniques described. In some embodiments, the table may include various columns, including a time column 308, a positioning data column 310, an acceleration data column 312, and an orientation data column 314. In some embodiments, an entry (e.g., "$T_1$") in the time column 308 may correspond to a time interval that begins at a particular time (e.g., $T_0$) and ends at the time indicated by the entry (e.g., $T_1$). In some embodiments, an entry in the positioning data column 310 may correspond to one or more geographic coordinates. For example, the geographic coordinates may be GPS coordinates received from a GPS receiver of the mobile phone. As depicted in FIG. 3, for example, the $T_1$ entry for positioning data is labeled as "GPS_coord_1," which may be represented in any suitable coordinates format (e.g., decimal degrees (DD), degrees, minutes, and seconds (DMS), etc.). In some embodiments, an entry in the acceleration data column 312 (e.g., "Accel_xyz_1") may correspond to an acceleration (e.g., meters/second$^2$) at entry $T_1$ of the mobile phone along one or more axes (e.g., an X-axis, Y-axis, and/or Z-axis), for example, generated by an accelerometer of the mobile phone. In some embodiments, an entry in the orientation data column 314 (e.g., "Orient_xyz_1") may correspond to an orientation (e.g., a rotational motion, which may be measured in degrees per second or revolutions per second (RPS)) of the mobile phone along one or more axes (e.g., an X-axis, Y-axis, and/or Z-axis), for example, generated by a gyroscope of the mobile phone.

The system may use the motion data 302 to generate a motion profile 303 of the vehicle (i.e., the target vehicle). For example, as discussed in more detail below, the system may execute a sensor fusion algorithm that receives one or more entries of the motion data 302 as input to generate the motion profile 303. In some embodiments, each entry of the motion profile 303 (e.g., which may be represented as an entry in a table) may indicate one or more aspects of the motion of the vehicle over a particular time interval (e.g., from time $T_1$ to time $T_2$). In some non-limiting examples, an entry of the motion profile 303 may correspond to information indicating one or more of: a direction, whether the vehicle is turning (e.g., left or right), a degree of the turn, a change in acceleration of the vehicle, a slope of the vehicle, whether the vehicle is stationary for a predetermined time interval (e.g., parked), etc. In some embodiments, an entry of the motion profile 303 may be generated in any suitable way. For example, a portion of an entry (e.g., acceleration) may be directly determined from one or more entries of the motion data 302. In another example, an entry may be determined based in part on heuristic information. For example, the system may determine a predefined time interval, whereby if a vehicle is determined to not have any movement for at least the predefined time interval, the vehicle is determined to be parked. In some embodiments, an entry of the motion profile 303 may be generated from one or more entries of the motion data 302 (e.g., spanning multiple time intervals of motion data measurements). It should be understood that, while the entries of motion profile 303 are depicted in human-readable format in FIG. 3, an entry of the motion profile 303 may be represented in any suitable machine-readable format (e.g., for efficient comparison with a candidate motion profile 306, discussed below).

Using FIG. 2 for illustration, the system may generate the $T_1$ entry in the motion profile 303 table indicating that the vehicle 203 is traveling West (according to the geographic direction 209) between time $T_0$ and $T_1$. While the vehicle is in route to the pickup center, from time $T_1$ until $T_m$, the mobile phone may continually transmit motion data measurements to the system, upon which the motion profile 303 table may be updated (e.g., right turn, left turn, increased speed, decreased speed, etc.). At time $T_m$, the vehicle 203 may be in the process of turning left into the parking lot, which may be in a Southwest direction, upon which the motion data transmitted for time entry $T_m$ may be used to update the motion profile 303.

Turning to flow 304 of FIG. 3 for more details about generating the candidate motion profile 306, the system may receive from one or more cameras (e.g., camera 205 and 207 of FIG. 2) a sequence of video frames, which may correspond to a plurality of images. A new plurality of images may be received for a particular time interval (e.g., the time interval between time $T_m$ and time $T_{m+1}$, between $T_{m+1}$ and $T_{m+2}$, etc.). Collectively, the sequence of video frames received by the system over multiple time intervals may be used to derive motion data 305 of a particular detected candidate vehicle (e.g., vehicle 203 of FIG. 2), which may be used to generate the candidate motion profile 306. As depicted in FIG. 3, the motion data 305 may be represented in a tabular format, whereby each row of the table may correspond to a particular time interval. The table may include various columns, including a time column 318, a direction column 320, a velocity column 322, and/or an acceleration column 324. Note that the time intervals indicated by the motion data 305 (e.g., time column 318) may be aligned (e.g., synchronized) with the time intervals indicated by motion data 302 (e.g., time column 308). For clarity of illustration purposes, FIG. 3 depicts the time intervals of motion data 302 and motion data 305 as being substantially the same. For example, the time entry $T_{m+1}$ for both motion data 302 and 305, respectively, corresponds to the same time interval between $T_m$ and $T_{m+1}$. It should be understood that any suitable method of aligning data measurements (e.g., received from the mobile device or via the one or more cameras) over time may be utilized. For example, in some embodiments, there may be an time offset between the motion data received from the mobile device and a sequence of frames received from a camera. In some embodiments, the system may determine this time offset in advance and correlate the different motion data entries accordingly.

In some embodiments, the plurality of images received for a given time interval of time column 318 may be used to determine motion data for that time interval. For example, as depicted in FIG. 2, until $T_m$, the vehicle 203 is not yet within the field of view of any camera. Accordingly, vehicle 203 may not be detected within an image, and thus, the system may not generate any motion data for vehicle 203. However, at time entry $T_{m+1}$, when the vehicle enters the field of view of a camera, the system may utilize the plurality of images for that time interval to determine (e.g., derive) motion data corresponding to one or more of: the candidate vehicle direction, velocity, and/or acceleration, etc. As described in further detail below, this motion data may be derived using one or more algorithms (e.g., machine learning algorithms, pixel comparisons across images, etc.). In the example depicted in FIG. 2, the time entry $T_{m+1}$ corresponds to the candidate vehicle moving South (e.g., according to geographic direction 209) with a velocity of 10 pixels/second and an acceleration (e.g., deceleration) of −5 pixels/second. In some embodiments, the system may determine a mapping between a number of pixels and a corresponding distance in the real world (e.g., a number of meters). Accordingly, based at least in part on the motion data 305 for a particular time interval, the system may generate a new entry for the candidate motion profile 306 (e.g., heading South, No turn, 2 meters/second, etc.). As the candidate vehicle navigates within the parking lot (e.g., turning right upon entering the lot, then turning south, etc.), the system may similarly generate new entries for the candidate motion profile 306 corresponding to time entries $T_{m+2}$, $T_{m+3}$, etc. In this way, the system may continually update the candidate motion profile of vehicle 203 (e.g., as a candidate vehicle) over time until a suitable time (e.g., when the vehicle 203 is determined to be the target vehicle or when the vehicle 203 is no longer within the field of view of any camera).

As described above, the system may compare the entries for each of the time intervals between the motion profile 303 and the candidate motion profile 306, starting from the time when the vehicle 203 first was detected by the system via one of the cameras (e.g., $T_{m+1}$). In this example, note that the entries for $T_{m+1}$, $T_{m+2}$, $T_{m+3}$, . . . $T_{m+n}$ are substantially the same between the motion profile 303 and the candidate motion profile 306. Because the entries are substantially the same between motion profiles 303 and 306 (starting from the $T_{m+1}$ entry), the score may be close to 1.0 (e.g., indicating high confidence that the motion profiles correspond to the same vehicle).

It should be understood that, although in this example, the system may determine that the two motion profiles 303 and 306 correspond to the same vehicle at time $T_{m+1}$ (e.g., when the vehicle is parked), embodiments of the present disclosure should not be construed to be so limited. For example, in some embodiments, the system may be able determine at time $T_{m+2}$, $T_{m+3}$, or any suitable time, that the motion profiles correspond to the same vehicle, including while the vehicle is still moving. As described further below (e.g., in reference to FIG. 4), depending on the level of confidence (e.g., a score), the system may transmit a message to a computing device of an associate of the order fulfillment center indicating that the candidate vehicle associated with the candidate motion profile 306 is a candidate vehicle for being the target vehicle that matches the motion profile 303 (e.g., associated with vehicle 203 of FIG. 2). In this way, the associate may be able to take more efficient action to deliver the order to the vehicle, for example, by walking towards the vehicle even while the vehicle may be navigating within the parking lot. It should be understood that, especially in a setting where high throughput of processing orders is critical, saving even a few seconds of time per customer order may provide significant value to the customer. It also may save significant computing resources over a large number of orders.

In some embodiments, the system may maintain one or more motion profiles that respectively correspond to one or more candidate vehicles within the field of view of the one or more cameras. Using FIG. 1 as an example, vehicle 116 may correspond to vehicle 203 of FIG. 2. In this example, the system may have generated a motion profile 303 based on motion data received from the mobile phone associated with vehicle 116 (e.g., block 202 of FIG. 2). The system may also have generated a candidate motion profile 306 (e.g., a "first candidate motion profile") of vehicle 116 (e.g., block 204 of FIG. 2) based on motion data derived from a plurality of images from the one or more cameras (e.g., cameras 108, 110, 111). Additionally, the system may also generate a second candidate motion profile for vehicle 118, a third candidate motion profile for vehicle 114, a fourth candidate motion profile for vehicle 122, a fifth candidate motion profile of vehicle 120, etc. In some embodiments, these candidate motion profiles may also be generated from the same plurality of images received from the one or more cameras that was used to generated the first candidate motion profile for vehicle 116. In some embodiments, for each of these candidate motion profiles derived from the plurality of images, a respective score may be determined by comparing a given candidate motion profile with the motion profile 303. The scores may then be compared and ranked against one another to determine which candidate motion profile derived from the plurality of images matches the motion profile 303. In this example, the candidate motion profile 306, corresponding to vehicle 203, is the matching motion profile. As described above, each of these scores and rankings may be adjusted either up or down, as the scores may be adjusted over each time interval. In some embodiments, as described above and depicted in FIG. 4, the system may transmit a message to a computing device of an associate of the order fulfillment center which includes a distinguishing indicator. The distinguishing indicator may indicate to the associate that a particular vehicle (e.g., vehicle 116) is a candidate vehicle among a plurality of candidate vehicles within the field of view of the one or more cameras that may be the target vehicle.

Figure 4:
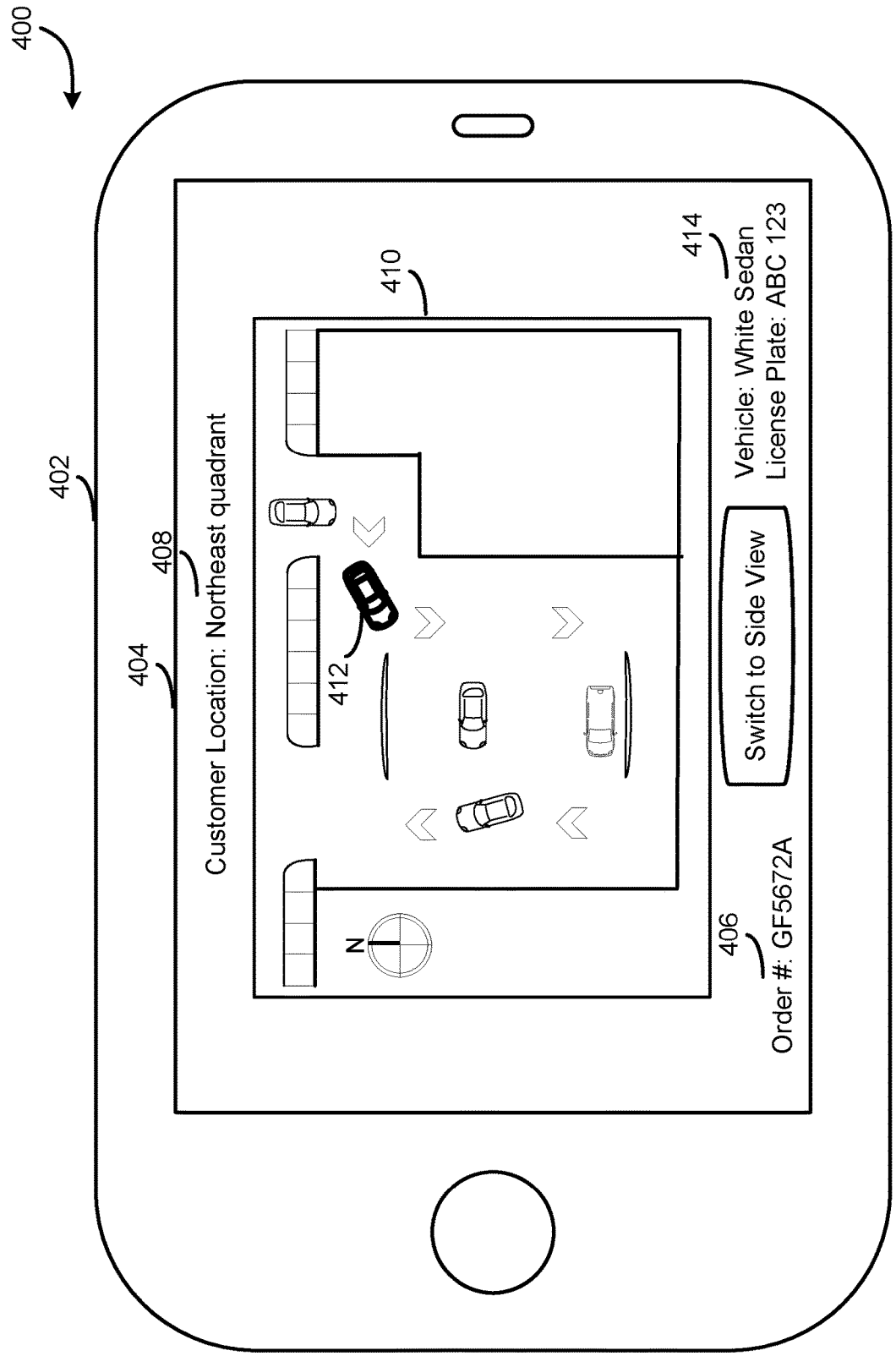
FIG. 4 is a simplified block diagram illustrating techniques for determining a location of a mobile object, according to some embodiments of the present disclosure.

Turning to FIG. 4, diagram 400 illustrates a display 404 of a computing device 402, according to some embodiments of the present disclosure. Using the order fulfillment center example above, in some embodiments, the computing device 402 may be associated with an associate of the order fulfillment center. In some embodiments, the computing device 402 may be a tablet device or any other suitable mobile computing device. As described earlier, in some embodiments, the computing device 402 may be equipped to perform any one or more of the functions of service provider system 106 of FIG. 1. For example, the computing device 402 may have a built-in camera on the back of the device. The camera may be suitable for capturing a plurality of images that identifies a candidate motion of a candidate vehicle through at least a portion of a location (e.g., similar to cameras 205 and/or 207 of FIG. 2). In some embodiments, the display 404 may be presented by a mobile application (e.g., an order fulfillment application) executing on the computing device 402. In diagram 400, the display 404 depicts a representation 410 of a parking lot of a pickup location. In some embodiments, the representation 410 may be similar to the parking lot 102 environment of pickup location 104 in FIG. 1, for example, with vehicle 412 corresponding to vehicle 116 of FIG. 1. In some embodiments, vehicle 412 may also correspond to vehicle 203 of FIG. 2 (e.g., at time $T_{m+2}$).

In some embodiments, the computing device 402 may receive a message (e.g., including a video stream, text message, etc.) from the system (e.g., service provider system 106), indicating that vehicle 412 has arrived in the parking lot, and that vehicle 412 is a candidate vehicle for the vehicle associated with the mobile device that placed the order 406 (e.g., Order #: GF5672A). In some embodiments, for example, if the system determines one or more physical characteristics of the candidate vehicle, the message may contain information about the physical characteristics. For example, the message may indicate vehicle information 414 (e.g., "White Sedan" and/or "License Plate ABC 123") about the candidate vehicle 412. This may help an associate to visually identify the candidate vehicle 412 among other vehicles. In some embodiments, and as depicted in FIG. 4, the message may include a video stream that includes a distinguishing indicator for the candidate vehicle 412. In some embodiments, the distinguishing indicator within the representation 410 may correspond to an augmented reality (AR) depiction. In one example, a real-world video feed of the parking lot may be enhanced by computer-generated information, for example, highlighting or otherwise marking a candidate vehicle (e.g., vehicle 412) within the representation 410 such that the candidate vehicle is identifiable within the video feed. The distinguishing indicator may follow the vehicle 412 as it navigates the parking lot. In some embodiments, the video feed may correspond to a field of view of a camera of the computing device 402 (e.g., a mobile device), with a user (e.g., the associate) holding the computing device 402 to point the camera in the direction of vehicles entering the parking lot (e.g., vehicle 412). In some embodiments, in addition to (or instead of) a top-down view, as depicted in representation 410, the display 404 may also allow the mobile application to view the parking lot from a side view. In some cases, this may make it easier for the associate to visualize and distinguish the candidate vehicle 412 among other vehicles as it navigates the parking lot. In some embodiments, an AR enhancement may be applied to different views (e.g., top-down, side view, birds eye view, etc.) and/or video feeds from different camera sources (e.g., the computing device 402, mounted cameras such as camera 205 or 207). In some embodiments, for example, in a case where the parking lot is large, the message may also indicate a location 408 within the parking lot (e.g., "Northeast quadrant"). This may make it easier for the associate to narrow down which section of the parking lot the vehicle 412 is currently navigating. It should be understood that the location 408 may be dynamically updated as the vehicle 412 navigates the parking lot.

As described above, in some embodiments, the candidate motion profile for vehicle 412 (e.g., candidate motion profile 306 of FIG. 3) may be compared with the motion profile derived from motion data from the mobile device associated with the customer order (e.g., motion profile 303 of FIG. 3) at each time interval to dynamically update a score. As the score is updated, the level of confidence that candidate vehicle 412 is the vehicle (i.e., the target/matching vehicle) may be adjusted up or down. In some embodiments, as the level of confidence is adjusted, the distinguishing indicator associated with the candidate vehicle 412 may be adjusted. For example, the highlight might change color, indicating growing or weakening confidence that the vehicle 412 is the matching vehicle. In some embodiments, more than one candidate vehicle may have a distinguishing indicator. For example, as described above, multiple vehicles may, respectively, have candidate motion profiles generated based at least in part on the plurality of images. When comparing each of these candidate motion profiles with the motion profile associated with the target vehicle (e.g., derived from the mobile device associated with the customer order), a respective score may be generated. These scores may be compared with each other in order to eliminate potential candidates over time. Thus, in one example, multiple candidate vehicles may be highlighted as potential candidates at a particular time. As time passes, one or more of the candidate vehicles may no longer be highlighted (e.g., or be highlighted with different color coding), until, at a later time, only one vehicle remains highlighted (e.g., the candidate vehicle determined to be the matching vehicle). In some embodiments, the system may further determine if the one remaining highlighted candidate vehicle has a score that matches (e.g., equals or exceeds) a predetermined threshold value, upon which the system may determine that the vehicle 412 is the correct matching vehicle. It should be understood that other variations of distinguishing and presenting candidate vehicles for display 404 on the computing device 402 may be possible.

Figure 5:
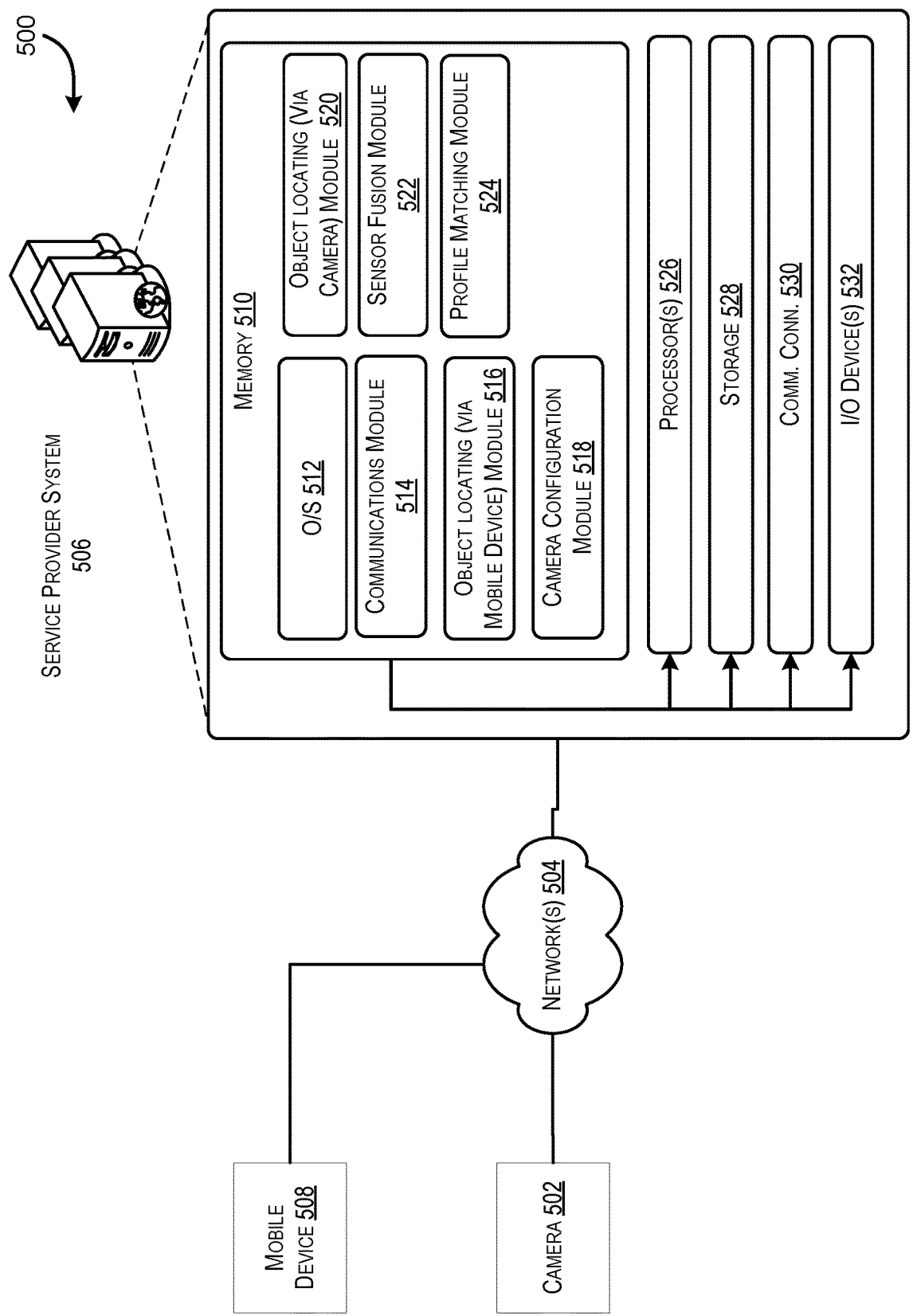
FIG. 5 is a simplified block diagram illustrating an example architecture of a system used for determining a location of a mobile object, according to some embodiments of the present disclosure.

FIG. 5 is a block diagram of an example architecture 500 of a system, including a service provider system 506 (e.g., service provider system 106 of FIG. 1) and a camera 502, to perform one or more functions of the system, according to some embodiments of the present disclosure. The service provider system 506 may receive motion data from a mobile device 508 (e.g., a customer's mobile phone) that is independent from the service provider system 506.

As described earlier, in some embodiments, the camera 502 may be connected to the service provider system 506 in any suitable way. For example, in some embodiments, the service provider system 506 may correspond to a cloud computing service (e.g., executing software as a service (SaaS)) that is located remotely (e.g., in the cloud) from the location where the camera is positioned (e.g., at a parking lot of a pickup center). In this example, the camera 502 may capture images and transmit the images to the cloud service for processing, as described below. Upon completing the processing, the cloud service may transmit a message (e.g., similar to as depicted in reference to FIG. 4) to a user device of an associate present at the pickup center, for example, to facilitate delivery of a customer order to a customer that has arrived. In another example, the service provider system 506 may be a local computer that is located at the same (or nearby) location where the camera 502 is positioned (e.g., inside the pickup center building), but may still be a separate device that performs processing. In this example, the camera 502 may capture images and transmit the images (e.g., over a network) to the local service provider system 506 (e.g., which may be a mobile device, desktop, etc.) for further processing. Upon completing the processing, the local service provider system 506 may transmit a message to a user device of an associate to facilitate delivery of the order, similar to as described above. In yet another example, the camera 502 may be part of the same physical computing unit as service provider system 506. For example, a user device of an associate (e.g., a tablet device, mobile phone, etc.) may correspond to service provider system 506 and may also house camera 502. In this example, camera 502 of the associate's user device may capture images which are then processed locally on the associate's user device. Upon completion of the processing, the user device may then display one or more elements (e.g., including a highlighted candidate vehicle), which may be similar to as described in reference to FIG. 4.

In some embodiments, the camera 502 may correspond to a single physical camera or one or more cameras (e.g., utilized to form a virtual camera). For example, in the case of a virtual camera, one or more cameras may have overlapping fields of view, as described above (e.g., camera 108, 110, and/or 111 of FIG. 1). Images received from the one or more cameras may be combined to form a virtual field of view of the virtual camera. For clarity of illustration, as described below and unless indicated otherwise, camera 502 may correspond to a single physical camera. In some embodiments, the camera 502 may be configurable to capture images of a quality such that target object recognition may be performed on the image (e.g., detecting at least a portion of a vehicle). In some embodiments, an off-the-shelf camera or built-in camera of a mobile device (e.g., capable of capturing two-dimensional (2D) images) may be used. In some embodiments, the camera should be capable of capturing images within a certain pixel resolution range that is sufficient to perform target object recognition on the image. This may vary depending on the type of target object the system has been trained to recognize. For example, for a system intended to recognize the characters on license plates attached to a vehicle, a 1080P resolution may be sufficient. However, for determining only the existence of a vehicle in a particular location, a lower resolution may be sufficient. It should be understood that embodiments of the present disclosure do not require a 3D camera, stereoscopic camera, time-of-flight camera, or other more expensive devices. Accordingly, a camera suitable to perform the method may require significantly less resources (computing and/or human resources) to purchase, setup, and maintain. Furthermore, it should also be understood that, although some embodiments of the present disclosure may utilize detection and/or identification of a license plate of a vehicle, embodiments should not be construed to be so limited. For example, in some embodiments, it may be sufficient to detect a motion of a portion of a vehicle within the field of view of camera 502, even if the portion detected is not associated with any unique physical characteristic (e.g., a license plate) that distinguishes the vehicle from other vehicles.

As described above, the camera 502 may be communicatively coupled to the service provider system 506 via a network 504. The network 504 may include any suitable communication path or channel such as, for instance, a wire or cable, fiber optics, a telephone line, a cellular link, a radio frequency (RF) link, a WAN or LAN network, the Internet, or any other suitable medium. The network 504 may include any one or a combination of many different types of networks, such as cable networks, the Internet, wireless networks, cellular networks, and other private and/or public networks. In some embodiments, as described above, the camera 502 may be coupled via hardware to the service provider system 506 as part of a single hardware unit.

The mobile device 508 may be any suitable mobile electronic device that may be operated by a user, which may also provide remote communication capabilities to the network 504. Examples of remote communication capabilities include using a mobile phone (wireless) network, wireless data network (e.g. 3G, 4G or similar networks), Wi-Fi, Wi-Max, Bluetooth, Ultra-wideband (UWB), or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile devices include drones, wearable devices, such as smart watches, fitness bands, ankle bracelets, rings, earrings, etc., as well as automobiles with remote communication capabilities. In some embodiments, the mobile device 508 may include an inertial measurement unit (IMU) and/or a GPS receiver. The IMU and GPS receiver may be used, individually or in combination, to generate motion data corresponding to the motion of the mobile device, whereby the motion data may include at least one of a positioning data, acceleration data, or orientation data. The IMU may use a combination of accelerometers, gyroscopes, and/or magnetometers. In some embodiments, the mobile device 508 may be associated with another device or object (e.g., a vehicle, person, drone, etc.) whereby the motion of the mobile device may substantially correspond to the motion of the other device.

Turning to the contents of the service provider system 506 in more detail, the service provider system 506 may be a computer system that comprises at least one memory 510, one or more processing units (or processor(s)) 526, a storage unit 528, a communication device 530, and an I/O device 532. The processor(s) 526 may be implemented as appropriate in hardware, computer-executable instructions, firmware or combinations thereof. Computer-executable instruction or firmware implementations of the processor(s) 526 may include computer-executable or machine executable instructions written in any suitable programming language to perform the various functions described.

The memory 510 may store program instructions that are loadable and executable on the processor(s) 526, as well as data generated during the execution of these programs. Depending on the configuration and type of service provider system 506, the memory 510 may be volatile (such as random access memory (RAM)) and/or non-volatile (such as read-only memory (ROM), flash memory, etc.). In some implementations, the memory 510 may include multiple different types of memory, such as static random access memory (SRAM), dynamic random access memory (DRAM) or ROM. The service provider system 506 may also include additional storage 528, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices.

The service provider system 506 may also contain communications connection(s) 530 that allow the service provider system 506 to communicate with a stored database, another computing device or server, user terminals, and/or other devices on the network(s) 504. The service provider system 506 may also include input/output (I/O) device(s) and/or ports 532, such as for enabling connection with a keyboard, a mouse, a pen, a voice input device, a touch input device, a display, speakers, a printer, etc.

Turning to the contents of the memory 510 in more detail, the memory 510 may include an operating system 512 and one or more application programs or services for implementing the features disclosed herein, including a communications module 514, an object locating (via mobile device) module 516, a camera configuration module 518, an object locating (via camera) module 520, a sensor fusion module 522, and a profile matching module 524.

The operating system 512 may provide executable program instructions for the general administration and operation of service provider system 506 and typically will include a computer-readable storage medium (e.g., a hard disk, random access memory, read only memory, etc.) storing instructions that, when executed by a processor of the service provider system 506, allow the service provider system 506 to perform its intended functions. Suitable implementations for the operating system and general functionality of the servers are known or commercially available and are readily implemented by persons having ordinary skill in the art, particularly in light of the disclosure herein.

The communications module 514 may comprise code that causes the processor 526 to generate messages, forward messages, reformat messages, and/or otherwise communicate with other entities. For example, the communications module 514 may receive motion data from mobile device 508, including for example, acceleration data, positioning data, orientation data, or any other suitable motion data. The communications module 514 may also receive a plurality of images from the camera 502, which may correspond to a sequence of video frames. The plurality of images may identify the motion of one or more objects (e.g., candidate objects) through at least a portion of a location (e.g., a parking lot), whereby the location is within the field of view of the camera 502. The communications module 514 may also transmit one or more messages to the other entities. For example, these messages may correspond to the messages transmitted to a computing device of an associate of a fulfillment center, as described in reference to computing device 402 of FIG. 4.

The object locating (via mobile device) module 516 may comprise code that causes the processor 526 to generate a motion profile of an object (e.g., a vehicle) based at least in part on motion data received from the mobile device 508. The motion profile generated by the object locating module 516 may identify the motion of the object over one or more time intervals, as described above (e.g., in reference to diagram 201 of FIG. 2 and flow 301 of FIG. 3). In some embodiments, the object locating module 516 may invoke the sensor fusion module 522 when generating the motion profile of the object based on motion data received from the mobile device 508, as discussed further below.

The camera configuration module 518 may comprise code that causes the processor 526 to determine a unified field of view that is suitable for performing embodiments of the present disclosure. In some embodiments, as described above, camera 502 may correspond to a single physical camera with a single field of view that captures at least a portion of a location (e.g., a parking lot). However, in other embodiments, the camera 502 may correspond to a virtual camera with a unified field of view (e.g., a virtual field of view), combining the fields of view of a plurality of cameras. For example, as described earlier in reference to FIG. 1, a plurality of cameras (e.g., camera 108, 110, 111) may have overlapping fields of view, whereby an object (e.g., vehicle 116) that is at least partially within the field of view of one camera (e.g., camera 108) may also be at least partially within the field of view of another camera (e.g., camera 110). In this example, the camera configuration module 518, operating as a virtual (e.g., software-based) camera, may determine that the object detected by images received from both cameras is the same object. In some embodiments, the camera configuration module 518 may compare images received from each of the plurality of cameras at a particular time, and utilize an image stitching algorithm to combine the multiple images together to produce a panoramic image. The camera configuration module 518 may thereby perform a video stitching by creating a series of panoramic images over a period of time. Any suitable conventional image/video stitching mechanism may be used to generate the unified field of view. In some embodiments, the camera configuration module 518 may determine parameters for creating the unified field of view as part of a setup phase, prior to generating motion profiles. In other embodiments, the parameters may be determined in real-time while generating the motion profiles. In some embodiments, the camera configuration module 518 may also be responsible for determining and maintaining in memory 510 intrinsic parameters (describing the camera's internal characteristics), extrinsic parameters (describing the camera's position and orientation in the real world), and any distortion parameters/coefficients (which account for any lens distortions). For example, these may be used to define a mapping between a real world location (e.g., a parking lot) and a 3D coordinate space of the camera 502. However, it should be understood embodiments of the present disclosure may still be performed even without mapping the real world (e.g., a parking area of a parking lot) to a 3D coordinate space of the camera 502. In some embodiments, the camera configuration module 518 may return a software object that corresponds to a virtual field of view, whereby another module (e.g., object locating module 520) may utilize the software object (e.g., as though the object locating module 520 is operating on a single image of the virtual field of view from a single camera).

In some embodiments, the camera configuration module 518 may further determine a unified field of view by performing one or more image stabilization techniques. For example, consider a case in which camera 502 is built-in to a mobile device (e.g., a tablet, or a drone) instead of being stationary at the location. While the mobile device may be positioned (e.g., held) to point the camera 502 towards vehicles entering the parking lot, there may be cases where the mobile device is moved. For example, an associate holding the mobile device may slightly move their hands or feet while the camera 502 captures images. In this case, the camera configuration module 518 may perform one or more stabilization techniques to account for movements of the camera. For example, in one technique, the module 518 may utilize one or more sensor devices to perform stabilization. These one or more sensor devices may be built into the mobile device, which may be similar to those described in reference to mobile device 508. For example, the mobile device may first determine a reference position. Then, an accelerometer and/or gyroscope of the mobile device may collect data corresponding to aspects of motion (e.g., offset motion) of the mobile device from the reference position. Based at least in part these measurements, the mobile device may calculate counter-offset values that may be used to synchronize images to the reference position (e.g., suitable for generating a candidate motion profile of a vehicle). In another technique, the mobile device may utilize a fixed visual reference point within images captured by the camera to stabilize the images. For example, the module 518 may detect a known fixed reference point (e.g., pixel-based) such as a light pole, a traffic sign, a monument, etc. Then, the module 518 may calculate an offset for each subsequent image received based on the fixed reference point. The module 518 may then counter-offset each image by the number of offset pixels in order to stabilize the images. In some embodiments, one or more stabilization techniques may be combined together. In some embodiments, the module 518 may crop a portion of each image to reduce variations between images. In some embodiments, the module 518 may determine a pre-defined threshold of movement, which may corresponding to acceptable degrees of movement under which the system may still be able to perform embodiments, as described herein. If the movement of the mobile device exceeds the threshold of movement, the mobile device may present a warning or other suitable message.

The object locating (via camera) module 520 may comprise code that causes the processor 526 to generate a motion profile (e.g., a candidate motion profile) of an object (e.g., a vehicle) based at least in part on a plurality of images received from camera 502. Similar to object locating module 516, the motion profile generated by the object locating module 520 may identify the motion of the object over one or more time intervals, as described above (e.g., in reference to diagram 201 of FIG. 2 and flow 304 of FIG. 3). In some embodiments, as an optimization, the object locating module 520 may begin generating a motion profile of an object when it receives an indication that the object is within a threshold range of a location (e.g., where the camera 502 is located). For example, using the diagram 201 of FIG. 2 for illustration, the service provider system 506 may receive a signal (e.g., including GPS coordinates) from a mobile phone associated with vehicle 203 at time $T_m$, which may indicate that the vehicle 203 is within 100 meters of the parking lot. The service provider system 506 may then activate the object locating module 520 to begin generating a candidate motion profile of vehicle 203, for example, beginning after time $T_m$. In some embodiments, the object locating module 520 may stop updating the candidate motion profile when the associated candidate vehicle is determined to be a match or otherwise filtered out from the list of candidate motion profiles.

In some embodiments, object locating module 520 may generate a candidate motion profile from the plurality of images received from camera 502 using one or more techniques. In one technique, the object locating module 520 may first receive the plurality of images from camera 502. The object locating module 520 may then detect an object (e.g., a vehicle) within a given image, for example, using a suitable object detection technique (e.g., a neural network trained to detect vehicles). The detected object may correspond to a first pixel-based representation (e.g., represented in pixel coordinates, which may correspond to the center of the detected object). The object locating module 520 may then detect the same object within a subsequent image and determine a second pixel-based representation of the object. The object locating module 520 may then determine a change in a motion of the object based at least in part on determining a difference between the first pixel-based representation and the second pixel-based representation. For example, the object locating module 520 may determine whether a pixel that was a particular color (e.g., corresponding to a portion of the vehicle) has changed to a different color (e.g., corresponding to an absence of the vehicle) within a certain time interval. The object locating module 520 may utilize this information to determine, for example, a direction, velocity, or acceleration of the object over time. The object locating module 520 may also utilize this information to determine if the object is turning in a particular direction. For example, based at least in part on the pixel-based representation of at least a portion of the object, the system may determine a plane (or line) in which the object is traveling. Then, at a later time interval, if the object locating module 520 determines that the object is traveling in a new plane (e.g., perpendicular to the previous plane), the system may determine that the object has turned in a certain direction.

In another technique for generating a candidate motion profile from the plurality of images received from camera 502, the object locating module 520 may utilize a neural network that is trained to detect one or more aspects of the motion of an object. For example, the neural network may be trained based at least in part on sample video sequences of frames that depict one or more of an object: accelerating, decelerating, turning, stopping, starting, maintaining velocity and/or direction, etc.

The sensor fusion module 522 may comprise code that causes the processor 526 to determine a motion profile of an object. In some embodiments, the sensor fusion module 522 may utilize one or more of a number of algorithms, including, but not limited to, a Kalman filter, a particle filter, and/or a neural network that is trained to receive the motion data as input. In some embodiments, these algorithms may be used to perform dead reckoning of the object (e.g., to determine the object's current position by using a previously determined position). For example, using FIG. 2 for illustration, the sensor fusion module 522 may receive motion data from a mobile device at time $T_2$, which may include at least one of positioning data, acceleration data, or orientation data. The sensor fusion module 522 may also receive data indicating a previously determined position, acceleration, and/or orientation of the mobile device (e.g., at time $T_1$). The sensor fusion module 522 may then combine (or "fuse") the different motion data together to determine (e.g., predict) a location of the object at $T_2$ (and a corresponding motion over the measured time interval between $T_1$ and $T_2$).

The profile matching module 524 may comprise code that causes the processor 526 to determine that an object associated with a candidate motion profile (e.g., determined based at least in part from images received from a camera) is the same object as a target object associated with a motion profile (e.g., determined from motion data received from a mobile device associated with the target object). In an example, and using block 206 of FIG. 2 and diagram 300 of FIG. 3 for illustration, the profile matching module 524 may compare the vehicle motion profile 303 with the candidate vehicle motion profile 306. Based at least in part on this comparison, the profile matching module 524 may determine a score that corresponds to a level of confidence that the vehicle associated with the motion profile 303 is the same vehicle as the vehicle associated with the candidate motion profile 306 (e.g., vehicle 203). As described above, one or more scores may be determined, respectively, for each of a plurality of candidate vehicles within the field of view of camera 502. Based at least in part on a ranking of the scores, the profile matching module 524 may determine one or more candidate vehicles that may match the motion profile 303. Over time, the profile matching module 524 may refine the ranking based at least in part on updated candidate motion profiles, and thereby eliminate candidate vehicles from consideration until a single vehicle is determined to be a matching vehicle.

Figure 6:
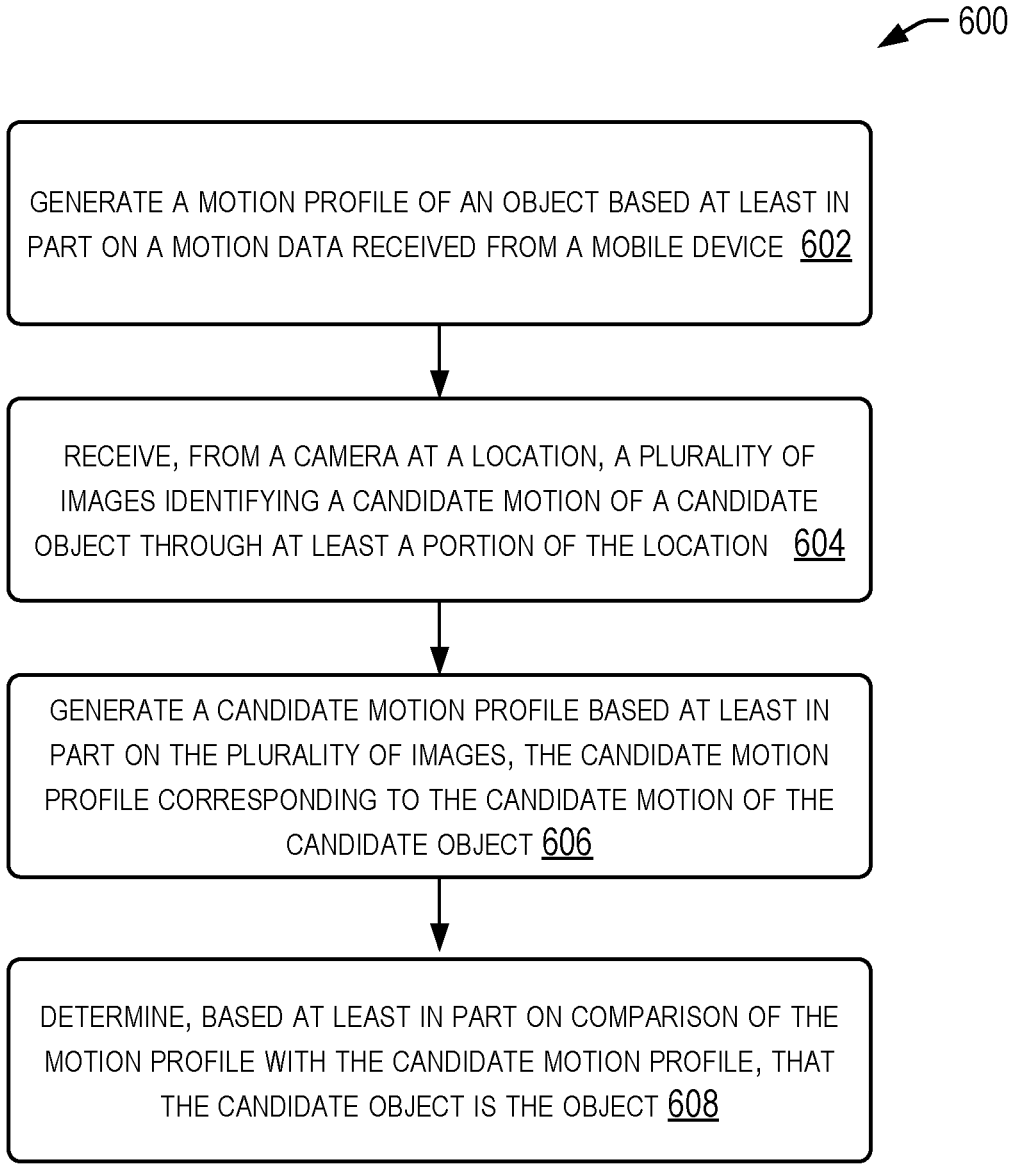
FIG. 6 is a simplified flow chart illustrating techniques for determining a location of a mobile object, according to some embodiments of the present disclosure.

FIG. 6 illustrates an example flow 600 for a computer system locating an object by comparing motion profiles of the object, according to some embodiments of the present disclosure. In some embodiments, the computer system may correspond to the service provider system 506 of FIG. 5. Some or all of the flow 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory.

The example flow may start at block 602, whereby the system may generate a motion profile of an object (i.e., a target object) based at least in part on a motion data received from a mobile device. In some embodiments, the operations of block 602 may be similar to those described in reference to block 202 of FIG. 2 and/or flow 301 of FIG. 3. As described above, although examples included herein primarily refer to the object being a vehicle (e.g., an automobile), embodiments of the present disclosure are not so limited. The object may be any suitable object, including, but not limited to, a vehicle, a person, a type of mobile equipment, etc. The object may be associated with the mobile device. For example, in the case of the mobile device being a mobile phone that is carried by a person and the object being a vehicle, the motion of the mobile device may correspond to the motion of the vehicle. In some cases, the mobile device may be a component of (or otherwise connected to) the object. For example, the object may be a drone that contains one or more sensor components that transmit motion sensor data of the drone as it moves.

At block 604, the system may receive from a camera at a location a plurality of images identifying a motion (e.g., a candidate motion) of a candidate object through at least a portion of the location. In some embodiments, the operations of block 604 may be similar to those described in reference to block 204 of FIG. 2 and/or flow 304 of FIG. 3. In some embodiments, the camera may be similar to camera 502 of FIG. 5. As described above, in some embodiments, the location may correspond to a parking area of a parking lot/garage. In other embodiments, the location may be any suitable physical topography. Some non-limiting examples may include real-world space, a floor of a building, etc. In some embodiments, the camera may be positioned (e.g., mounted, carried) so that it may capture the candidate motion of at least a portion of the candidate object through at least a portion of the location. In some embodiments, the camera may be a component of a mobile device, for example, computing device 402 of FIG. 4. For example, an associate may position (e.g., carry) the mobile device to capture vehicles entering the parking lot (e.g., from a side-angle view). In this example, the system may be configured to compensate for a movements of the camera, as described in reference to FIGS. 4 and 5. For example, the system may utilize one or more stabilization techniques (e.g., utilizing an accelerometer and/or camera vision) to account for slight movements of the camera while the associate is holding the camera. If the system detects movement of the camera that exceeds a predefined threshold of movement, the system may display a warning message on the mobile device. It should be understood that, although in some embodiments, the entire candidate object (e.g., vehicle) may be captured within the field of view of the camera, embodiments of the present disclosure should not be construed to be so limiting. For example, the system may still perform embodiments described herein, even if a license plate of the vehicle is not captured within the field of view of the camera.

At block 606, the system may generate a candidate motion profile based at least in part on the plurality of images, whereby the candidate motion profile may correspond to the candidate motion of the candidate object. In some embodiments, the operations of block 606 may be similar to those described in reference to block 204 of FIG. 2 and/or flow 304 of FIG. 3.

At block 608, the system may determine that the candidate object is the object based at least in part on a comparison of the motion profile with the candidate motion profile. In some embodiments, the system may generate a score based at least in part on the comparison of the candidate motion profile (of the candidate object) with the motion profile (of the target object). In some embodiments, the operations of block 608 may be similar to those described in reference to block 206 of FIG. 2 and/or process 300 of FIG. 3. As described herein, the motion profile and the candidate motion profile, respectively, may include any suitable information indicating an aspect of the motion and the candidate motion occurring within a particular time interval. For example, although motion data 302 of FIG. 3 is depicted as including positioning data, acceleration data, and orientation data, any suitable motion data received from one or more sensors of the mobile device may be used and/or derived to generate the motion profile (e.g., velocity, distance from the earth, etc.). Similarly, although motion data 305 of FIG. 3 is depicted as including direction data, velocity data, and acceleration data, any suitable motion data may be used and/or derived from the plurality of images received from the camera to generate the candidate motion profile. The motion profile and the candidate motion profile should be of suitable format that enables the system to compare the two motion profiles. Accordingly, motion profile 303 and candidate motion profile 306 of FIG. 3 correspond to non-limiting examples of two motion profiles that may be compared (and/or correlated) by the system.

In some embodiments, the system may utilize other factors beyond comparing the motion profiles to determine the score. For example, in a case where the object is a vehicle, a license plate may be attached to the vehicle. In some embodiments, the camera of the system may capture the license plate. The system may receive physical characteristics data corresponding to the vehicle license plate (e.g., performing Automated License Plate Recognition (ALPR)) and then correlate the recognized license plate with information within a system database. For example, a customer may have previously registered their vehicle information (e.g., license plate, vehicle make/model, color, etc.) with the service provider, and/or the system may have stored this information based on a previous purchase by the customer. The system may utilize this information as input when determining the score, for example, to increase or decrease a confidence level that the object associated with the motion profile is the same object as the candidate object associated with the candidate motion profile.

In some embodiments, determining that the candidate object is the object may include filtering out other candidate objects among a plurality of candidate objects. For example, in some embodiments, the system may first determine that the candidate object is one of a plurality of candidate objects that may be the object, as described further below in reference to FIG. 7. In some embodiments, upon determining that the candidate object is the object (e.g., or a potential matching object, after narrowing down a list of candidate objects), the system may transmit one or more messages to a computing device. The one or more messages may alert a user (e.g., an associate of a service provider) that the target object (e.g., the vehicle associated with a customer/user) has arrived, for example, as described in reference to diagram 400 of FIG. 4.

Figure 7:
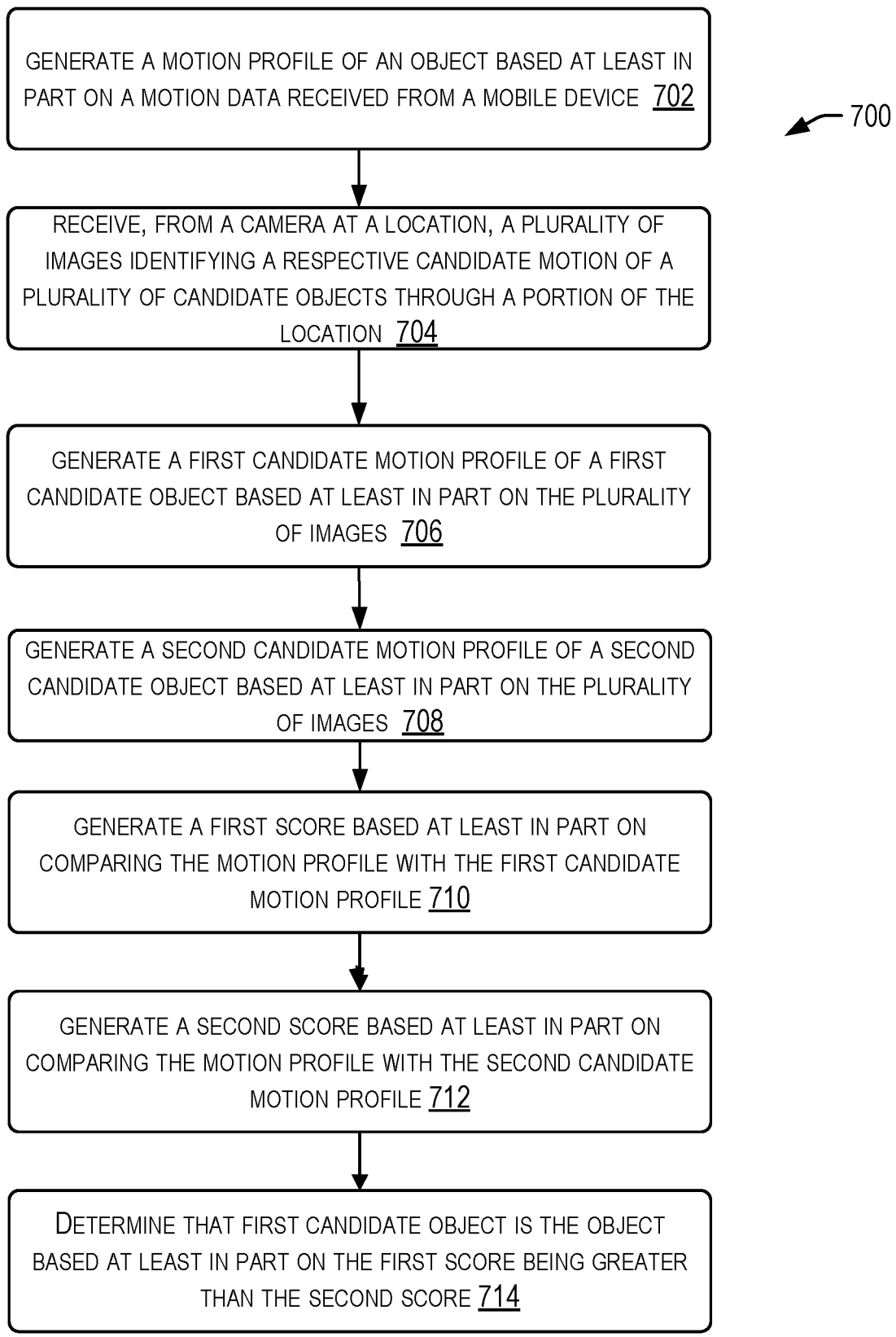
FIG. 7 is a simplified flow chart illustrating techniques for determining a location of a mobile object, according to some embodiments of the present disclosure.

FIG. 7 illustrates an example flow for a computer system identifying an object among a plurality of objects by comparing motion profiles, according to some embodiments of the present disclosure. In some embodiments, the computer system may correspond to the service provider system 506 of FIG. 5.

The example flow may start at block 702, whereby the system may generate a motion profile of an object (i.e., a target object) based at least in part on a motion data received from a mobile device. In some embodiments, block 702 may be similar to block 602 of FIG. 6.

At block 704, the system may receive from a camera at a location a plurality of images identifying a respective candidate motion of a plurality of candidate objects through a portion of the location. In some embodiments, block 704 may be similar to block 604 of FIG. 6.

At block 706, the system may generate a first candidate motion profile of a first candidate object based at least in part on the plurality of images. In some embodiments, the first candidate object may be one of the plurality of candidate objects within a field of view of the camera. In some embodiments, block 706 may be similar to block 606 of FIG. 6.

At block 708, the system may generate a second candidate motion profile of a second candidate object based at least in part on the plurality of images. In some embodiments, the second candidate object may also be one of the plurality of candidate objects within the field of view of the camera. In some embodiments, the second candidate motion profile may be generated in a similar way to generating the first candidate motion profile.

At block 710, the system may generate a first score based at least in part on comparing the motion profile of the object with the first candidate motion profile of the first candidate object. In some embodiments, block 710 may be similar to block 608 of FIG. 6.

At block 712, the system may generate a second score based at least in part on comparing the motion profile of the object with the second candidate motion profile of the second candidate object. In some embodiments, block 712 may be similar to block 608 of FIG. 6, except that it is performed with respect to the object and the second candidate object.

At block 714, the system may determine that first candidate object is the object based at least in part on the first score being greater than the second score. In some embodiments, the system may generate candidate motion profiles for each of the plurality of candidate objects based on the plurality of images received from the camera. A score may be generated for each candidate motion profile, by comparing the respective candidate motion profile (e.g., determined based on motion data derived from images received from the camera) to the motion profile (e.g., determined based on motion data from the mobile device). In some embodiments, these scores may be ranked (e.g., highest to lowest), according to which candidate motion profile matches (e.g., correlates most closely with) the motion profile. Based at least in part on this ranking, one or more candidate matches may be determined. As each of the motion profiles are updated over time (e.g., in real time), the scores and corresponding rankings may be adjusted up or down. In this way, candidate objects may be eliminated over time. In the event that no candidate object remains, the system may send an alert to a user (e.g., an associate of the service provider) that the system was unable to locate a matching vehicle. In some embodiments, even if a candidate object is ranked highest among other candidate objects, the system may defer determining that the candidate object is the correct matching object unless (or until) the score for the candidate object matches (e.g., equals or exceeds) a predetermined threshold value (e.g., 90% confidence level). The system may present one or more candidate objects for display to the user in an suitable way, as described in reference to diagram 400 of FIG. 4.

Figure 8:
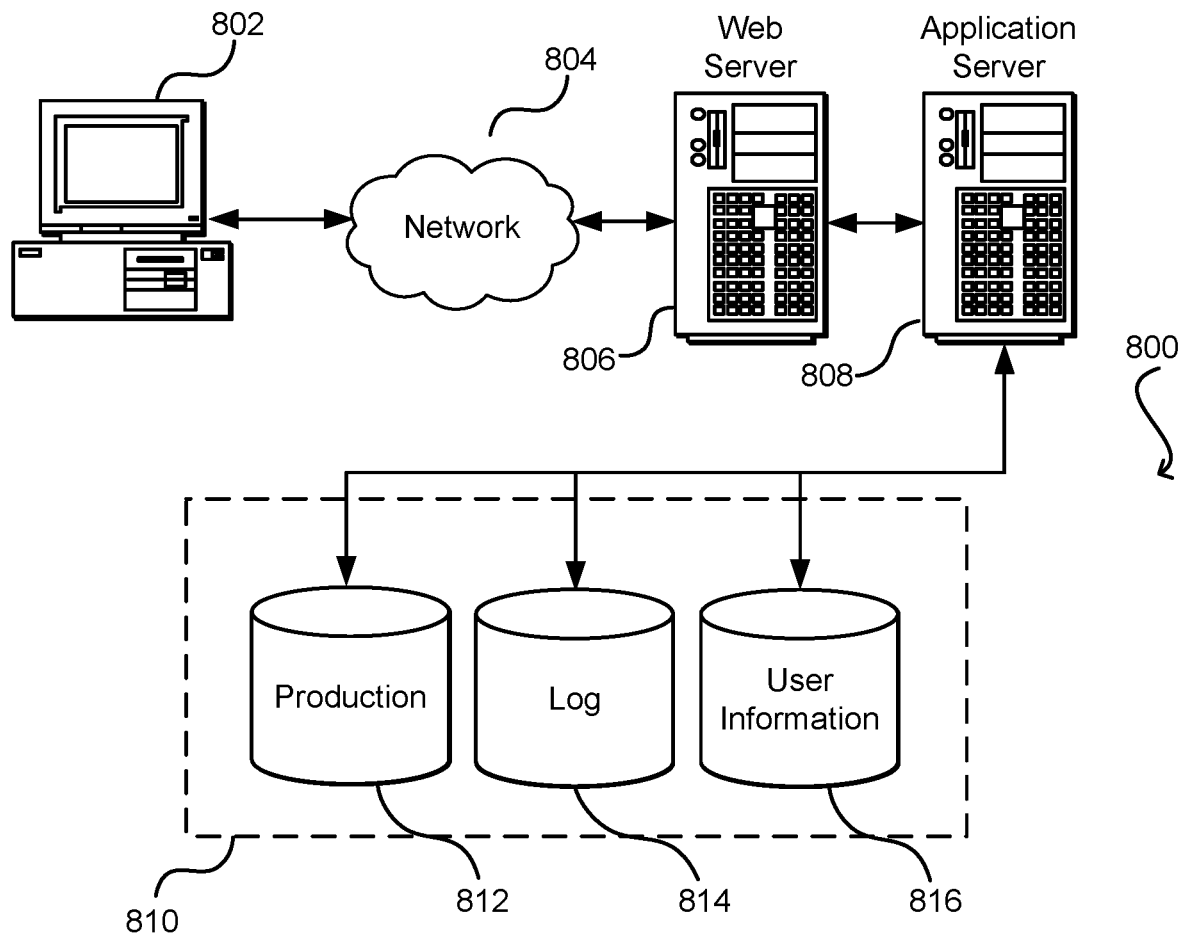
FIG. 8 is a schematic diagram illustrating an example environment for implementing aspects in accordance with at least one embodiment.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a mobile device, information associated with arrival of a vehicle at a location, the vehicle associated with the mobile device and having a motion towards the location;
   receiving from the mobile device first orientation data and first positioning data;
   generating a motion profile of the vehicle corresponding to the motion of the vehicle based at least in part on a sensor fusion algorithm that uses a particle filter, a previously determined position of the vehicle, the first orientation data, and the first positioning data from the mobile device, the previously determined position of the vehicle determined based at least in part on second positioning data from the mobile device, the second positioning data previously received from the mobile device;
   receiving, from a camera at the location, a plurality of images that identifies a candidate motion of a candidate vehicle of a plurality of vehicles through at least a portion of the location, the portion of the location being within a field of view of the camera;
   generating a candidate motion profile of the candidate vehicle based at least in part on determining motion of the candidate vehicle, the motion of the candidate vehicle determined using the plurality of images and a change in pixels and colors of the pixels in the plurality of images, the candidate motion profile corresponding to the candidate motion of the candidate vehicle;
   generating a score based at least in part on comparing the motion profile with the candidate motion profile;
   determining, based at least in part on the score, that the candidate vehicle is the vehicle;
   determining a parking location of the vehicle at the location; and
   transmitting a message to a computing device of an associate at the location, the message including the parking location and indicating that a user associated with the mobile device has arrived at the parking location to pick up an item.

2. The computer-implemented method of claim 1, wherein the candidate vehicle is a first candidate vehicle, the candidate motion is a first candidate motion, and the candidate motion profile is a first candidate motion profile, the plurality of images also identifying a second candidate motion of a second candidate vehicle through at least the portion of the location, and wherein determining that the first candidate vehicle is the vehicle further comprises:
   generating a second candidate motion profile of the second candidate vehicle based at least in part on the plurality of images, the second candidate motion profile corresponding to the second candidate motion of the second candidate vehicle;
   generating a second score based at least in part on comparing the first candidate motion profile with the second candidate motion profile; and
   determining that the score is greater than the second score.

3. The computer-implemented method of claim 1, wherein the mobile device is a mobile phone that includes at least one of (1) an inertial measurement unit (IMU) or (2) a global positioning system (GPS) receiver.

4. The computer-implemented method of claim 1, wherein the motion profile and the candidate motion profile, respectively, include information indicating one or more turns of the vehicle and the candidate vehicle within a particular time interval.

5. A non-transitory computer-readable storage medium storing computer-executable instructions that, when executed by a computer system, configure the computer system to perform operations comprising:
   receiving, from a mobile device, information associated with arrival of a vehicle at a location, the vehicle associated with the mobile device and having a motion towards the location;
   receiving, from the mobile device, first orientation data and first positioning data;
   generating a motion profile of the vehicle corresponding to the motion of the vehicle based at least in part on a sensor fusion algorithm that uses a particle filter, a previously determined position of the vehicle, the first orientation data, and the first positioning data from the mobile device, the previously determined position of the vehicle determined based at least in part on second positioning data from the mobile device, the second positioning data previously received from the mobile device;
   receiving, from a camera at a location, a plurality of images that identifies a candidate motion of a candidate vehicle of a plurality of vehicles through at least a portion of the location, the portion of the location being within a field of view of the camera;

generating a candidate motion profile of the candidate vehicle based at least in part on determining motion of the candidate vehicle, the motion of the candidate vehicle determined using the plurality of images and a change in pixels and colors of the pixels in the plurality of images, the candidate motion profile corresponding to the candidate motion of the candidate vehicle;
generating a score based at least in part on comparing the motion profile with the candidate motion profile;
determining, based at least in part on the score, that the candidate vehicle is the vehicle;
determining a parking location of the vehicle at the location; and
transmitting a message to a computing device of an associate at the location, the message including the parking location and indicating that a user associated with the mobile device has arrived at the parking location to pick up an item.

6. The non-transitory computer-readable storage medium of claim 5, wherein the score corresponds to a probability that the candidate vehicle is the vehicle.

7. The non-transitory computer-readable storage medium of claim 6, wherein the candidate vehicle is a first candidate vehicle, candidate motion is a first candidate motion, and the candidate motion profile is a first candidate motion profile, the candidate vehicle being one of a plurality of candidate vehicles within the field of view of the camera, the plurality of images also identifying a second candidate motion of a second candidate vehicle of the plurality of candidate vehicles through at least the portion of the location, and wherein determining that the vehicle is the first candidate vehicle further comprises:
generating a second candidate motion profile of the second candidate vehicle based at least in part on the plurality of images, the second candidate motion profile corresponding to the second candidate motion of the second candidate vehicle;
generating a second score based at least in part on comparing the motion profile with the second candidate motion profile; and
determining that the score is greater than the second score.

8. The non-transitory computer-readable storage medium of claim 6, wherein the score is adjusted up or down in real-time based at least in part on at least one of: (1) new motion data received from the mobile device, or (2) new images received from the camera.

9. The non-transitory computer-readable storage medium of claim 6, wherein determining that the candidate vehicle is the vehicle further comprises:
determining that the score matches a predetermined threshold value.

10. The non-transitory computer-readable storage medium of claim 5, wherein the location corresponds to a parking lot, at least a portion of the parking lot being reserved for vehicles to park in a location that is not a demarcated parking space.

11. The non-transitory computer-readable storage medium of claim 5, wherein generating the motion profile further comprises:
inputting the first orientation data and the first positioning data into the sensor fusion algorithm that utilizes a Kalman filter.

12. The non-transitory computer-readable storage medium of claim 5, wherein the motion profile and the candidate motion profile, respectively, include information indicating an aspect of the motion and the candidate motion occurring within a particular time interval.

13. A system, comprising:
one or more cameras; and
a computer system communicatively coupled with the one or more cameras, the computer system comprising one or more processors and one or more non-transitory computer-readable storage media storing instructions that, upon execution by the one or more processors, cause the computer system to, at least:
receive, from a mobile device, information associated with arrival of a vehicle at a location, the vehicle associated with the mobile device and having a motion towards the location;
receive, from the mobile device, first orientation data and first positioning data;
generate a motion profile of the vehicle corresponding to the motion of the vehicle based at least in part on a sensor fusion algorithm that uses a particle filter, a previously determined position of the vehicle, the first positioning orientation data, and the first positioning data from the mobile device, the previously determined position of the vehicle determined based at least in part on second positioning data from the mobile device, the second positioning data previously received from the mobile device;
receive, from the one or more cameras at the location, a plurality of images that identifies a candidate motion of a candidate vehicle of a plurality of vehicles through at least a portion of the location, the portion of the location being within a field of view of at least one of the one or more cameras;
generate a candidate motion profile of the candidate vehicle based at least in part on determining motion of the candidate vehicle, the motion of the candidate vehicle determined using the plurality of images and a change in pixels and colors of the pixels in the plurality of images, the candidate motion profile corresponding to the candidate motion of the candidate vehicle;
generate a score based at least in part on comparing the motion profile with the candidate motion profile;
determine, based at least in part on the score, that the candidate vehicle is the vehicle;
determine a parking location of the vehicle at the location; and
transmit a first message to a computing device of an associate at the location, the first message including the parking location and indicating that a user associated with the mobile device has arrived at the parking location to pick up an item.

14. The system of claim 13, wherein the one or more cameras comprise a first camera and a second camera, and wherein the second camera and the first camera have overlapping fields of view; and
the one or more computer-readable storage media store further instructions that, when executed by the one or more processors, further cause the computer system to:
correlate the overlapping fields of view based at least in part on a physical characteristic of the candidate vehicle; and
generate, based at least in part on the correlating, a virtual field of view; and
generate the candidate motion profile based at least in part on the virtual field of view.

15. The system of claim 13, wherein the candidate vehicle is one of the plurality of vehicles within the field of view of the at least one of the one or more cameras, and wherein the one or more non-transitory computer-readable storage media store further instructions that, when executed by the one or more processors, further cause the computer system to:

generate a distinguishing indicator associated with the candidate vehicle; and transmit a second message including the distinguishing indicator to the computing device for presentation to the associate for use in distinguishing the candidate vehicle among the plurality of vehicles.

16. The system of claim 13, wherein generating the candidate motion profile further comprises:

determining a first pixel-based representation corresponding to the candidate vehicle within a first image of the plurality of images;

determining a second pixel-based representation corresponding to the candidate vehicle within a second image of the plurality of images that is subsequent to the first image; and determining that an aspect of the candidate motion has changed based at least in part on a difference between the first pixel-based representation and the second pixel-based representation.

17. The system of claim 13, wherein generating the candidate motion profile further comprises:

inputting the plurality of images into a neural network that is trained to detect at least one aspect of the candidate motion.

18. The system of claim 13, the one or more non-transitory computer-readable storage media storing further instructions that, when executed by the one or more processors, further cause the computer system to:

determine, based at least in part on the first orientation data and the first positioning data, that the mobile device is within a threshold range of the location; and initiate generating the candidate motion profile based at least in part on determining that the mobile device is within the threshold range.

19. The system of claim 13, wherein generating the score further comprises:

receiving physical characteristics data corresponding to at least one physical characteristic of the vehicle; and detecting, based at least in part on the plurality of images, that the at least one physical characteristic of the vehicle is also characteristic of the candidate vehicle.

20. The system of claim 13, wherein only a portion of the candidate vehicle is captured within the field of view of the at least one of the one or more cameras, the portion being independent of a unique physical characteristic of the vehicle.

\* \* \* \* \*